(12) United States Patent
Long

(10) Patent No.: US 10,172,472 B2
(45) Date of Patent: Jan. 8, 2019

(54) POCKETED SPRING ASSEMBLY HAVING MULTI-LAYERED IMPERMEABLE FABRIC

(71) Applicant: L&P Property Management Company, South Gate, CA (US)

(72) Inventor: Austin G. Long, Sarcoxie, MO (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 16/021,919

(22) Filed: Jun. 28, 2018

(65) Prior Publication Data

US 2018/0303246 A1 Oct. 25, 2018

Related U.S. Application Data

(63) Continuation-in-part of application No. 15/584,402, filed on May 2, 2017, now Pat. No. 10,076,193, (Continued)

(51) Int. Cl.
*A47C 27/06* (2006.01)
*A47C 27/00* (2006.01)
*A47C 27/045* (2006.01)
*A47C 27/05* (2006.01)
*B29C 65/08* (2006.01)
(Continued)

(52) U.S. Cl.
CPC .......... *A47C 27/064* (2013.01); *A47C 27/007* (2013.01); *A47C 27/008* (2013.01); *A47C 27/045* (2013.01); *A47C 27/05* (2013.01); *B29C 65/086* (2013.01); *B29C 65/5057* (2013.01); *B29C 65/522* (2013.01); *B29C 65/7894* (2013.01); *B29C 66/1122* (2013.01); *B29C 66/712* (2013.01); *B29C 66/7294* (2013.01); *B32B 37/1284* (2013.01); *B32B 37/203* (2013.01); *B32B 2037/1215* (2013.01); *B32B 2310/028* (2013.01)

(58) Field of Classification Search
CPC .................................................... A47C 27/06
USPC .......... 5/716, 720, 655.8, 654.1; 29/91, 91.1
See application file for complete search history.

(56) References Cited

U.S. PATENT DOCUMENTS 2,878,012 A 3/1959 Crites
4,234,983 A * 11/1980 Stumpf ................ A47C 27/064
5/246
(Continued)

FOREIGN PATENT DOCUMENTS

DE 2513270 10/1976
EP 1067090 1/2001
(Continued)

*Primary Examiner* — Frederick C Conley
(74) *Attorney, Agent, or Firm* — Wood, Herron & Evans, LLP

(57) ABSTRACT

A pocketed spring assembly comprises a plurality of parallel strings of individually pocketed springs. Each string is joined to at least one adjacent string. Each string has first and second opposed plies of fabric and a plurality of pockets formed along a length of the string by transverse segmented seams joining the plies. Gaps between the segments of the seams allow air to pass into and out of the pockets despite the fabric being impermeable to airflow through the fabric. The fabric has at least four layers. The size of the gaps determines the firmness or "feel" of the pocketed spring assembly or portion thereof.

21 Claims, 19 Drawing Sheets

Related U.S. Application Data which is a continuation-in-part of application No. 15/062,595, filed on Mar. 7, 2016, now Pat. No. 10,034,553.

(51) Int. Cl.
| | | |
|---|---|---|
| *B29C 65/50* | (2006.01) | |
| *B29C 65/52* | (2006.01) | |
| *B29C 65/78* | (2006.01) | |
| *B29C 65/00* | (2006.01) | |
| *B32B 37/12* | (2006.01) | |
| *B32B 37/20* | (2006.01) | |

(56) References Cited

U.S. PATENT DOCUMENTS

| | | |
|---|---|---|
| 4,485,506 A | 12/1984 | Stumpf et al. |
| 4,574,099 A | 3/1986 | Nixon |
| 4,594,278 A | 6/1986 | Nixon |
| 5,438,718 A | 8/1995 | Kelly et al. |
| 6,319,864 B1 | 11/2001 | Hannigan et al. |
| 6,537,930 B1 | 3/2003 | Middlesworth et al. |
| 6,591,438 B1 | 7/2003 | Edling |
| 6,602,809 B1 | 8/2003 | Cabrey |
| 6,706,225 B2 | 3/2004 | Cabrey |
| 6,826,796 B1 | 12/2004 | Mossbeck |
| 7,410,030 B2 | 8/2008 | Fusiki et al. |
| 7,622,406 B2 | 11/2009 | Holland et al. |
| 7,636,972 B2 | 12/2009 | Mossbeck et al. |
| 7,788,952 B2 | 9/2010 | Morrison |
| 7,820,570 B2 | 10/2010 | Holland et al. |
| 7,828,029 B2 | 11/2010 | Holland et al. |
| 7,877,964 B2 | 2/2011 | Spinks et al. |
| 8,087,114 B2 | 1/2012 | Lundevall |
| 8,136,187 B2 | 3/2012 | Mossbeck et al. |
| 8,157,051 B2 | 4/2012 | Marcel et al. |
| 8,322,487 B1 | 12/2012 | Kitchen et al. |
| 8,464,830 B2 | 6/2013 | Ishikawa et al. |
| 8,574,700 B2 | 11/2013 | Hattori |
| 8,695,757 B2 | 4/2014 | Duval et al. |
| 9,133,615 B2 | 9/2015 | Bischoff et al. |
| 2002/0025747 A1 | 2/2002 | Rock et al. |
| 2003/0104735 A1 | 6/2003 | Rock et al. |
| 2004/0131836 A1 | 7/2004 | Thompson |
| 2004/0133988 A1 | 7/2004 | Barber |
| 2007/0137926 A1 | 6/2007 | Albin, Jr. et al. |
| 2008/0184493 A1 | 8/2008 | Mossbeck et al. |
| 2009/0298374 A1 | 12/2009 | Delmas |
| 2010/0255270 A1 | 10/2010 | Stuebiger |
| 2011/0014406 A1 | 1/2011 | Coleman et al. |
| 2011/0197367 A1 | 8/2011 | Mossbeck |
| 2013/0029550 A1 | 1/2013 | Seth et al. |
| 2013/0174350 A1 | 7/2013 | Allman et al. |
| 2013/0198941 A1 | 8/2013 | John et al. |
| 2014/0287643 A1 | 9/2014 | Nozaki et al. |
| 2015/0026893 A1 | 1/2015 | Garrett et al. |
| 2015/0284901 A1 | 10/2015 | Blackwell, Jr. et al. |
| 2015/0359350 A1 | 12/2015 | Eigenmann et al. |

FOREIGN PATENT DOCUMENTS

| | | |
|---|---|---|
| EP | 1707081 | 4/2008 |
| EP | 2789267 | 10/2014 |
| GB | 167025 | 2/1921 |
| WO | 2014023975 | 2/2014 |

\* cited by examiner

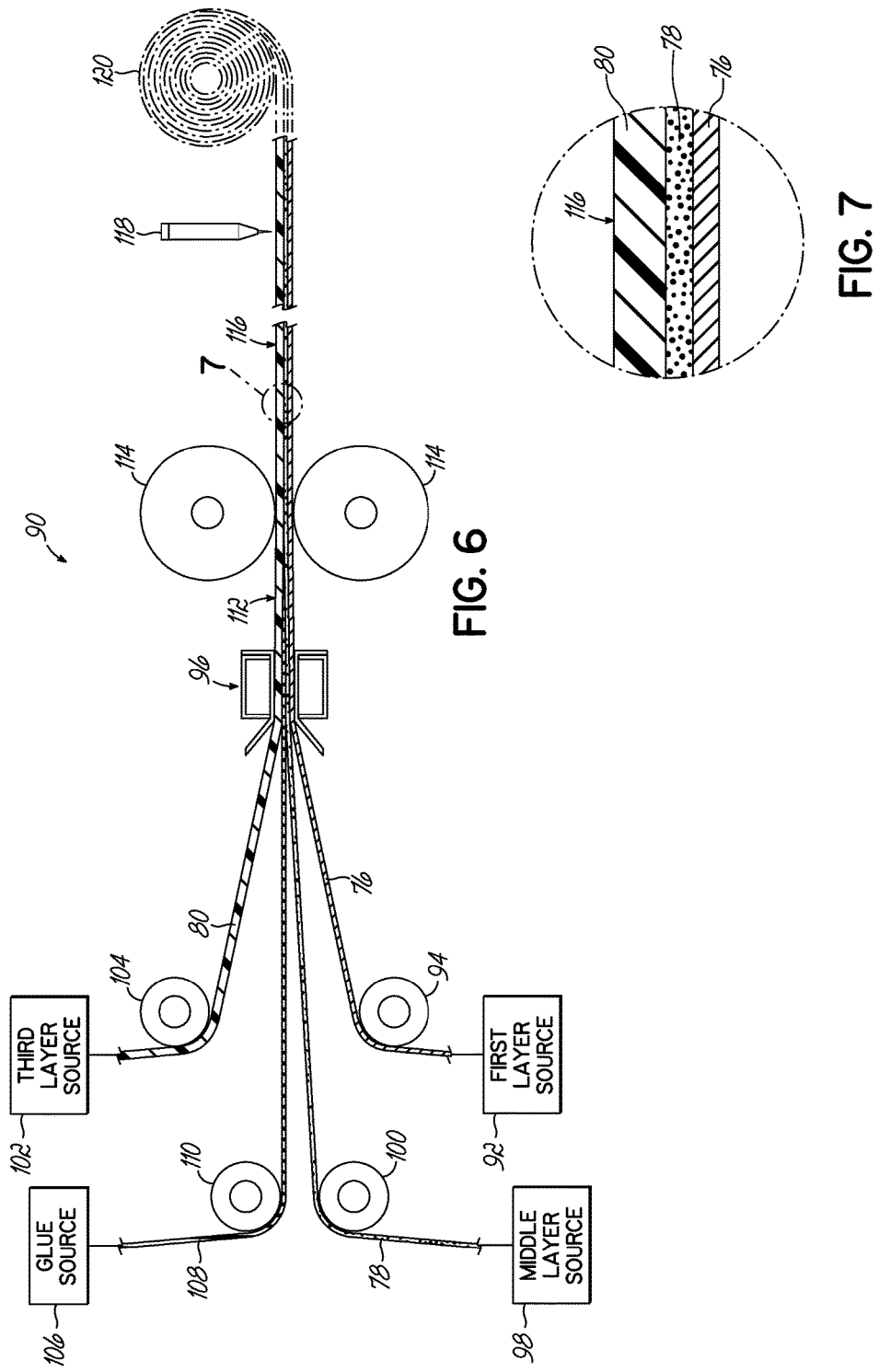

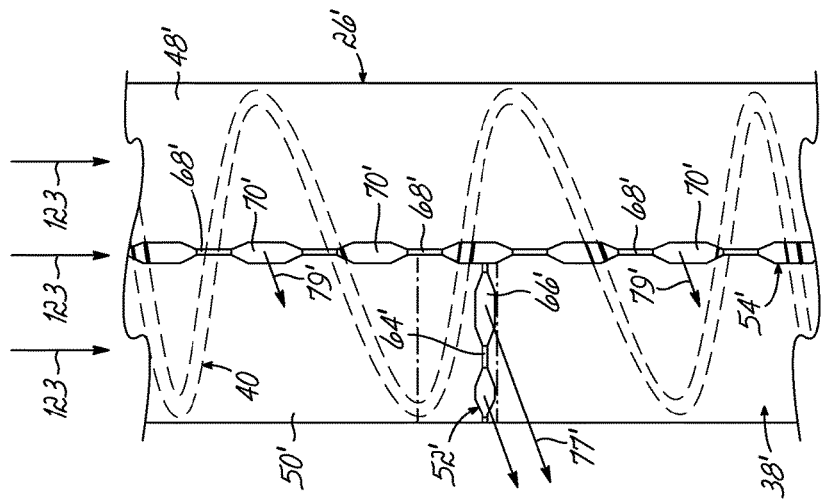
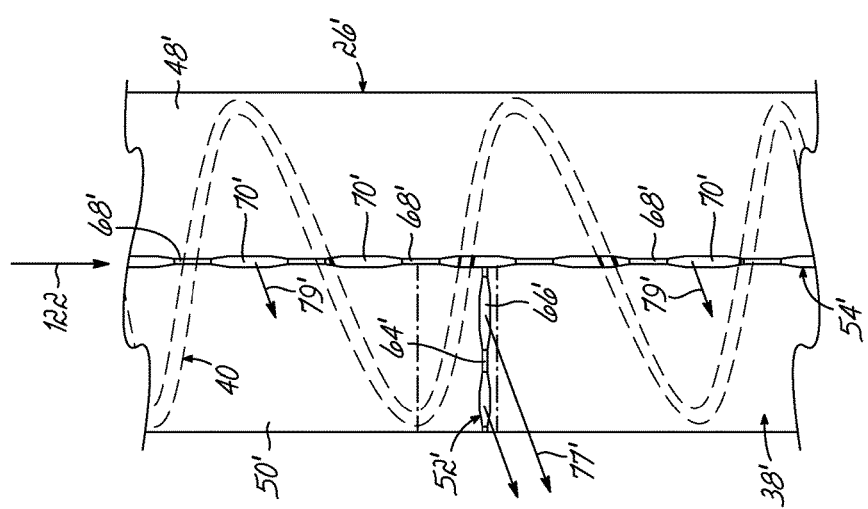
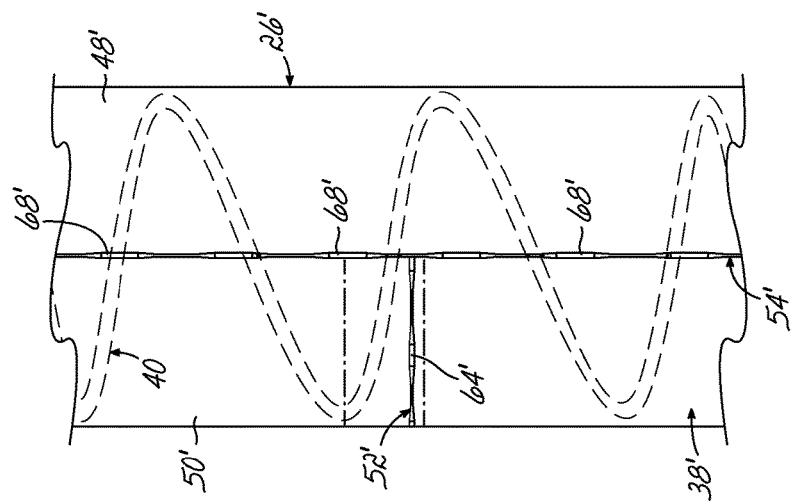

POCKETED SPRING ASSEMBLY HAVING MULTI-LAYERED IMPERMEABLE FABRIC

CROSS REFERENCE TO RELATED APPLICATIONS

This application is a continuation-in-part of U.S. patent application Ser. No. 15/584,402 filed May 2, 2017, which is a continuation-in-part of U.S. patent application Ser. No. 15/062,595 filed Mar. 7, 2016. Each of these applications is fully incorporated by reference herein.

FIELD OF THE INVENTION

This invention relates generally to fabric for use in bedding and seating products and, more particularly, for use in pocketed spring assemblies used in bedding and seating products.

BACKGROUND OF THE INVENTION

Mattress spring core construction over the years has been a continuously improving art with advancements in materials and machine technology. A well-known form of spring core construction is known as a Marshall spring construction wherein metal coil springs are encapsulated in individual pockets of fabric and formed as elongate or continuous strings of pocketed coil springs. In an earlier form, these strings of coil springs were manufactured by folding an elongate piece of fabric in half lengthwise to form two plies of fabric and stitching transverse and longitudinal seams to join the plies of fabric to define pockets within which the springs were enveloped.

More recently, improvements in spring core constructions have involved the use of fabrics which are thermally or ultrasonically weldable to themselves. By using such welding techniques, these fabrics have been advantageously used to create strings of individually pocketed coil springs wherein transverse and longitudinal welds, instead of stitching, are used to form the pockets encapsulating the springs. A fabric which has been used and proven to ultrasonically weld to itself is a non-woven polypropylene fabric which is extremely permeable to airflow. In other words, air may freely flow through the non-woven polypropylene fabric.

Once strings of pocketed springs are constructed, they may be assembled to form a spring core construction for a mattress, cushion or the like by a variety of methods. For example, multiple or continuous strings may be arranged in a row pattern corresponding to the desired size and shape of a mattress or the like, and adjacent rows of strings may be interconnected by a variety of methods. The result is a unitary assembly of pocketed coil springs serving as a complete spring core assembly.

Spring cores may be generally covered on the top and often on the bottom by pads of resilient foam as, for example, a pad of urethane or latex/urethane mix of foamed material. Within the last several years, more expensive cushions or mattresses have had the spring cores covered by a visco-elastic foam pad, which is slow-acting or latex foam, which is faster-acting, than visco-elastic foam. That is, the visco-elastic foam pad is slow to compress under load and slow to recover to its original height when the load is removed from the visco-elastic foam pad. These visco-elastic pads, as well as the latex pads, impart a so-called luxury feel to the mattress or cushion. These pads also, because of their open cell structure, retain heat and are slow to dissipate body heat when a person sits or lies atop such a foam pad-containing cushion or mattress.

Individually pocketed spring cores have been made with fabric material which causes the pocketed spring core to depress slowly when a load is applied and rise slowly when the load is removed, thereby imparting a luxury feel to the user of a bedding or seating product, such as a mattress. Bedding or seating products, such as mattresses, made of such fabric may have a feel like the feel of a product incorporating viscoelastic or memory foam, but without the foam and its associated cost and heat. A bedding or seating product having such a feel is known in the industry as a slow recovery bedding or seating product.

One known method of creating a pocketed spring assembly having a slow recovery feel is to perforate the fabric such that air passes through the perforations.

Another known method of creating a pocketed spring assembly having a slow recovery feel is to coat a known fabric to make the coated fabric semi-impermeable to airflow through the coated fabric, as disclosed in U.S. Pat. No. 7,636,972, which is fully incorporated herein. Such fabric may comprise a base layer having one or more layers of material sprayed or coated thereon to retard the rate of compression and expansion of the pocketed springs. The permeability of the coated fabric is retarded such that when a load is placed on a pocketed spring assembly made with such semi-impermeable fabric, the rate at which the pocketed spring assembly compresses is slowed. Similarly, when a load is removed from the pocketed spring assembly, the rate of expansion of the pocketed springs is slowed.

Making a pocketed spring assembly with coated semi-impermeable fabric may be challenging in an industrial setting. Because imparting a uniform coating is difficult, the proper air permeability value is difficult to maintain. Further, coated semi-impermeable fabric contains layers which may not be conducive to ultrasonic welding which may make weld consistency challenging. Another drawback of a pocketed spring assembly made from coated fabric is that the resultant semi-impermeable fabric of the pocket may create "noise", as the sound is named in the industry. Such noise may be created by the fabric expanding upon removal of the load due to the coil spring's upwardly directed force on the fabric.

Regardless of which manufacturing method is used to create a semi-impermeable pocketed spring assembly, the flow rate of air exiting or entering the pockets is constant regardless of the load applied to the pockets. The perforations in the fabric do not adjust and react to the load being applied to the pocket(s) of strings of the pocketed spring assembly. The inability of the fabric pockets to adjust air flow rates is a problem when considering pressure impulses, for example those caused by someone jumping on the bed or cushion containing a pocketed spring assembly made with known semi-impermeable fabric.

It is therefore an objective of this invention to provide a pocketed spring assembly made, at least partially with fabric impervious to airflow through the fabric, but which allows air to enter and exit the pockets at different flow rates in reaction to different loads being applied to one or more pockets.

It is further an objective of this invention to provide a pocketed spring assembly made, at least partially with fabric impervious to airflow through the fabric, but may allow air to enter and exit the pockets via gaps in the seams of the pockets.

It is therefore an objective of this invention to provide a fabric for a pocketed spring assembly which is impervious to airflow through the fabric, but may be secured to itself consistently with segmented seams.

It is another objective of this invention to provide a method of making a fabric for a pocketed spring assembly which ultrasonically welds to itself, impervious to airflow through the fabric, and quiet.

SUMMARY OF THE INVENTION

According to one aspect of the present invention, a bedding or seating product incorporates a novel pocketed spring assembly. The pocketed spring assembly comprises a plurality of parallel strings of springs joined together. Each string is joined to at least one adjacent string. Each string comprises a plurality of aligned individually pocketed springs. Each string comprises a piece of fabric folded around multiple springs to create first and second opposed plies of fabric on opposite sides of the springs. Opposed edges of the piece of fabric are joined together along a longitudinal seam which may extend along one of the sides of the string of springs. Pockets are formed along the length of the string of springs by transverse or separating seams joining the first and second plies, at least one spring being positioned in each pocket. The piece of fabric is impermeable to airflow and comprises multiple layers including a sound attenuation layer between layers of non-woven polypropylene.

In the illustrated embodiment, each of the seams is segmented, the fabric being welded to itself along segments of the seam. Each of the segmented seams has gaps between the segments of the seams. Upon being subjected to a load, air inside a pocket exits the pocket through the gaps between the seam segments. Upon being subjected to a load the gaps increase in size, allowing more air inside the pocket to exit the pocket.

It is within the scope of the invention that only some of the seams be segmented. In other words, some of the seams or portions thereof may be solid seams without segments and gaps between the segments for air to flow through. In such a pocketed spring assembly, some of seams, or portions thereof, may be segmented with gaps between seam segments. Such solid seams may be mixed with segmented seams in any desired fashion to create a desired airflow pattern.

At least some of the segmented seams, or portions thereof, have gaps between segments of the seams, such that upon being subjected to a load the gaps increase in size, allowing more air inside the pocket to exit the pocket. Upon the load being removed, air enters a pocket through gaps between the seam segments, or portions thereof. Once a pocket is sufficiently full of air, the gaps of the segmented seams, or portions thereof, may be smaller in size than when the pocket was under a load. In such a relaxed condition or state little air, if any, flows through the gaps of the segmented seams, or portions thereof, until another load is placed on the pocket or an adjacent pocket(s) to increase the size of the affected gaps.

The bedding or seating product may further comprise cushioning material and an upholstered covering encasing the pocketed spring assembly and cushioning materials.

The strings of springs may extend longitudinally (head-to-foot) or transversely (side-to-side). Regardless of the orientation of the parallel strings of springs, a bedding or seating product may be posturized into regions or zones of different firmness by incorporating different strings of springs into the product.

If the strings of springs extend longitudinally, a bedding product may include a plurality of the strings of springs having different airflows between gaps in the seams, or portions thereof, between adjacent pockets. For example, the product may include two such zones; a "his" side and a "hers" side. The "hers" side, or zone, may have strings of springs having larger gaps in the transverse seams, or portions thereof, than the gaps of the transverse seams, or portions thereof, of the strings of springs in the "his" side of the product. The result may be increased airflow through gaps in the seams, or portions thereof, in the "hers" side of the product, resulting in a softer zone or region than the "his" side or zone. By incorporating strings of springs having different airflow characteristics through the gaps in the seams, or portions of the seams, into different zones or regions of a pocketed spring assembly, different zones or regions of a product may have different feels or firmnesses.

According to another aspect of the invention, the pocketed spring assembly comprises a plurality of parallel strings of springs joined together. Although the pocketed spring assembly is typically used in bedding or seating products, the pocketed spring assembly may be used in any product. Each of the strings of springs comprises a plurality of individually pocketed springs. Each of the strings of springs comprises a piece of fabric joined along a longitudinal seam, first and second opposed plies of fabric being on opposite sides of the springs. Pockets are formed along a length of the string of springs by transverse seams joining the first and second plies, at least one spring being positioned in each pocket. The piece of fabric is impermeable to airflow, but upon the pocket being subjected to a load, air inside the pocket exits the pocket through gaps between segments of one or more seams, or portions thereof.

The piece of fabric used to make a string of springs may be made of multiple layers. In one preferred embodiment, the fabric comprises at least four layers: a first protective layer made of polypropylene non-woven material or other suitable material; a second layer impermeable to airflow which may be made of thermoplastic polyurethane film or other suitable material; a third sound attenuating or dampening layer secured to the second and fourth layers to prevent noise when the pocketed spring assembly is compressed and expanded and a fourth layer made of polypropylene non-woven material or other suitable material. In many circumstances, the first and fourth outer layers of the fabric may be the same material, but do not necessary have to be identical. The third layer may be made of lofted needle punch polyester fiber batting or similar material such as polyurethane foam, for example. The second and third layers may be glued or laminated together. In some instances, all adjacent layers may be glued or laminated together. When the piece of fabric is wrapped around spaced springs and ultrasonically welded to itself along seams, partially or entirely segmented, to form a string, the first protective layer is closest to the springs on the inside of the string and the fourth protective layer is furthest away from the springs on the outside of the string. The second layer sandwiched between the first and third layers preventing air from entering or exiting the pockets except via gaps in the segmented seams. The second or middle layer is flexible and substantially impermeable to air flow. In some embodiments, all the layers are laminated together.

According to another aspect of the invention, a method of making a fabric for use in a pocketed spring assembly is provided. The method comprises creating a stack comprising opposed layers of protective material such as polypropylene non-woven material, a sound attenuating layer of lofted needle punch polyester fiber batting, a glue layer and a layer of thermoplastic polyurethane film impermeable to airflow. The next step comprises passing the stack through a laminator to melt the glue to secure the sound attenuating layer of lofted needle punch polyester fiber batting to one side of the impermeable layer of thermoplastic polyurethane film. If desired, an additional layer of glue may be placed in the stack between the first protective layer of polypropylene non-woven material and the layer of thermoplastic polyurethane film to join them together. Likewise, an additional layer of glue may be placed in the stack between the fourth or outermost protective layer of polypropylene non-woven material and the sound attenuating layer of lofted needle punch polyester fiber batting. The multi-layered finished fabric may be rolled up for storage to be used later. Alternatively, the finished fabric may be immediately cut to a desired size.

According to another aspect of the invention, a method of making a pocketed spring assembly for use in a bedding or seating product is provided. The method comprises joining a plurality of parallel strings of springs together. Each of the strings of springs comprises a plurality of individually pocketed springs. Each of the strings of springs further comprises a piece of fabric joined along a longitudinal seam, first and second opposed plies of fabric being on opposite sides of the springs. Pockets are formed along a length of the string of springs by transverse segmented seams joining the first and second plies. At least one spring is positioned in each pocket. The piece of fabric is impermeable to airflow, but air inside the pocket exits and air enters the pocket through gaps between segments along one or more of the seams, or portions thereof.

The piece of fabric comprises a unitary fabric having at least four joined layers: at least two outer protective layers of polypropylene non-woven material, at least one layer of thermoplastic polyurethane film impermeable to airflow, and at least one sound attenuating or quieting layer such as lofted needle punch polyester fiber batting. The piece of fabric is oriented such that one of the outer protective layers of polypropylene non-woven material is closest to the springs or resilient members inside the pockets of the string and the other is furthest away from the springs or resilient members.

The multi-layered fabric pockets of the present invention provide a consistent luxurious feel regardless of the load placed on the pockets. The ability of the pockets to react to different loads placed thereon by changing the amount of air flow through adjacent pocket and/or out of strings produce a luxurious slow recovery feel regardless of the load placed on the pocketed spring assembly or portion thereof. The valves of the pocketed spring assembly of the present invention prevent the middle layer of film from rupture even when a heavy load is applied suddenly, such as when a heavy person jumps on a bed or sits on a cushion containing a pocketed spring assembly at least partially made from the fabric of the present invention.

The accompanying drawings, which are incorporated in and constitute a part of this specification, illustrate embodiments of the invention and, together with the summary of the invention given above, and the detailed description of the drawings given below, explain the principles of the present invention.

BRIEF DESCRIPTION OF THE DRAWINGS

FIG. 6 is a side elevational view of an apparatus for practicing one of the methods of making one of the fabrics of the present invention.

FIG. 7 is an enlarged view of the encircled area 7 of FIG. 6.

FIG. 12A is a partial end view of one of the strings of springs of the pocketed spring assembly of FIG. 1 in an ambient state.

FIG. 12B is a partial end view of the strings of springs of FIG. 12A being compressed.

FIG. 12C is a partial end view of the strings of springs of FIG. 12A being further compressed.

DETAILED DESCRIPTION OF THE INVENTION

Figure 1:
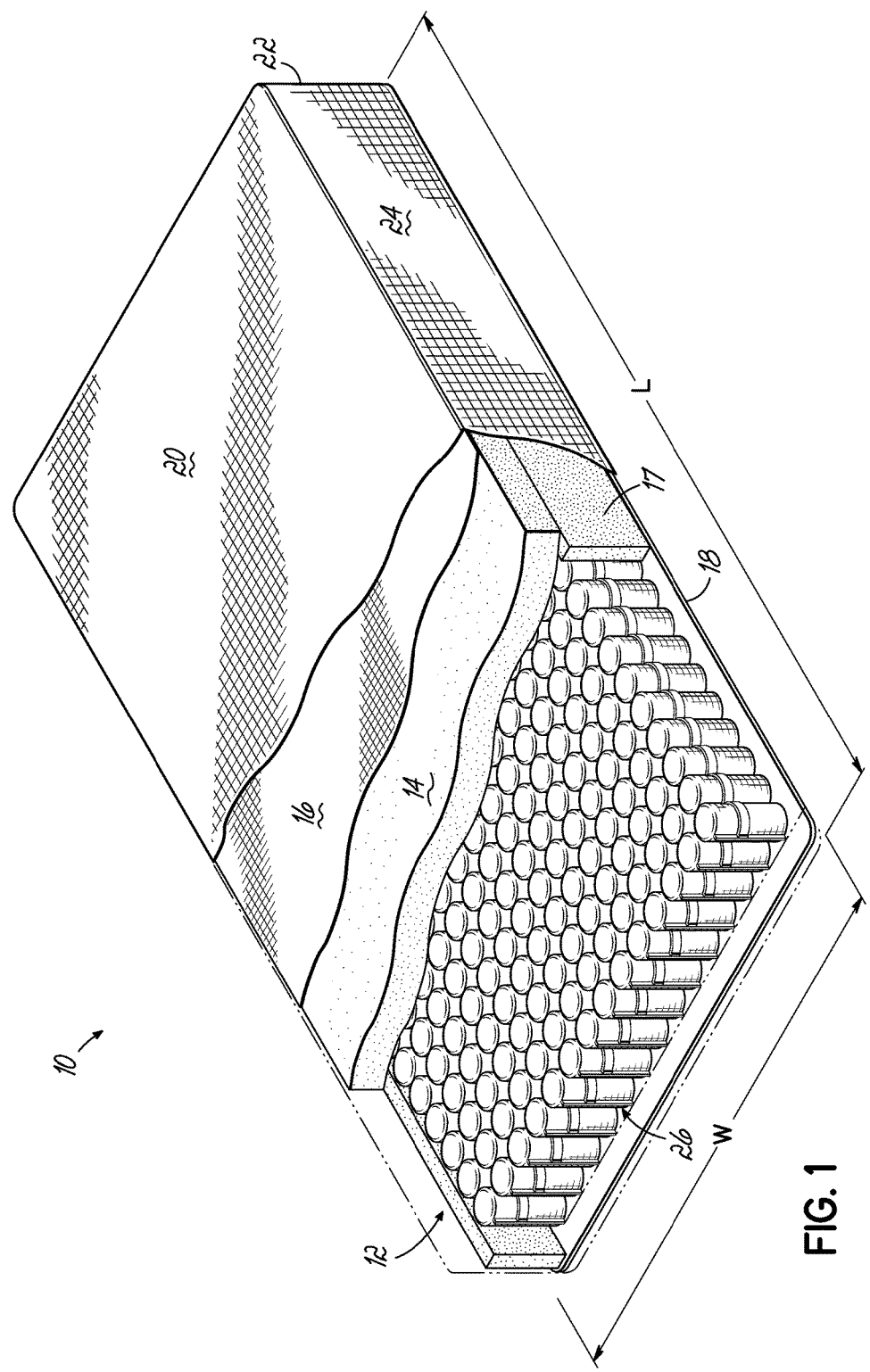
FIG. 1 is a perspective view, partially broken away, of a bedding or seating product incorporating a pocketed spring assembly according to the principles of the present invention.
Figure 1A:
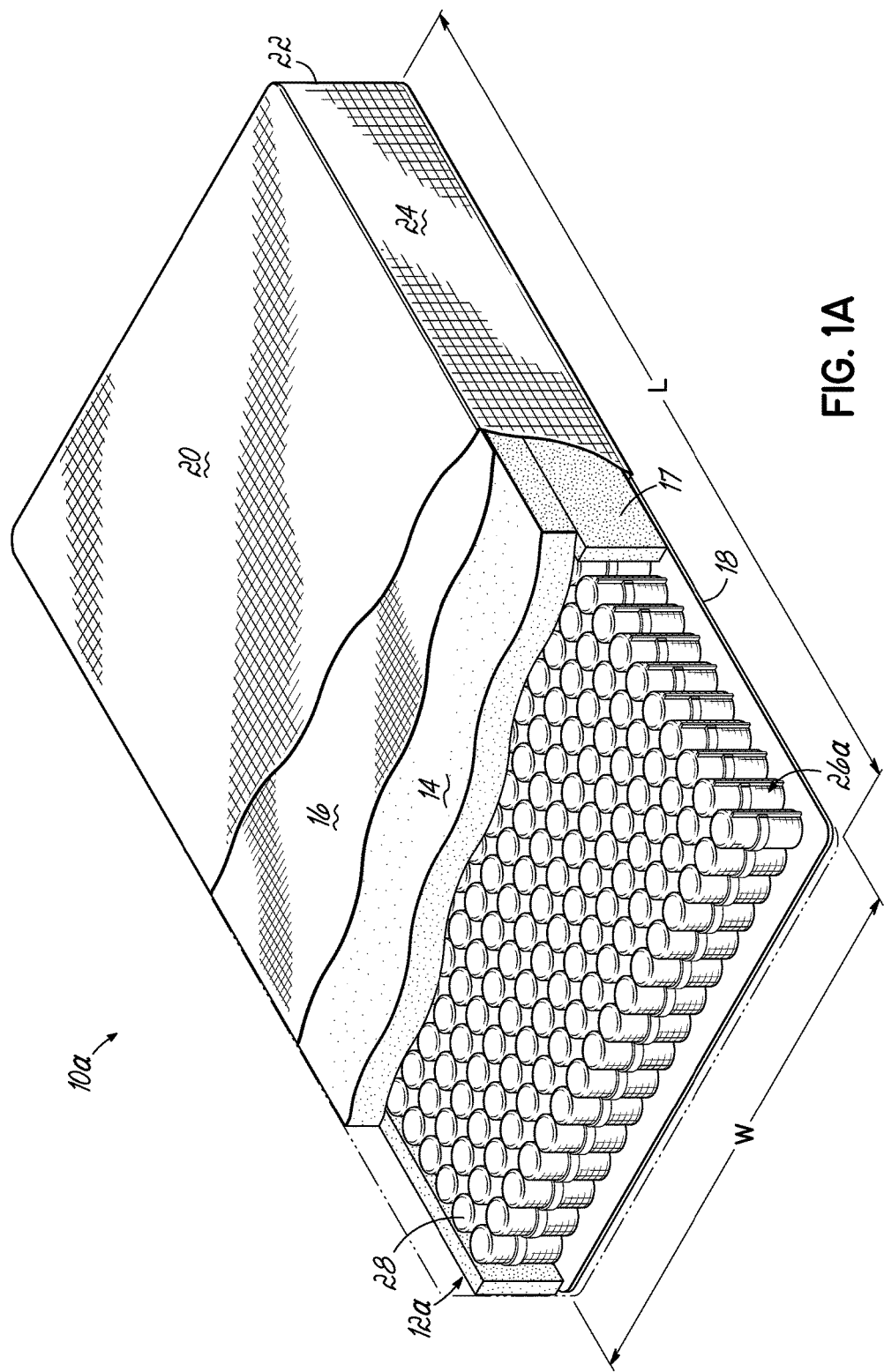
FIG. 1A is a perspective view, partially broken away, of a bedding or seating product incorporating another pocketed spring assembly.

Referring first to FIG. 1, there is illustrated a bedding product in the form of a single-sided mattress 10 incorporating the principles of the present invention. This product or mattress 10 comprises a pocketed spring assembly 12 over the top of which lays conventional padding or cushioning layers 14, 16 which may be foam, fiber, gel, a pocketed spring blanket, one or more scrim sheets or any other suitable materials or any combination thereof. The pocketed spring assembly 12 may be surrounded with a border 17 made of foam or any other suitable material (only a portion being shown in FIG. 1). Although one type of border 17 is illustrated in FIGS. 1, 1A, 1B and 1C, the border may assume other forms or shapes of any desired size, such as pocketed coil springs. In place of a foam border, it has become common to at least partially surround a pocketed spring assembly with springs of a different diameter or height than the pocketed springs of the interior of the pocketed spring assembly. In any product shown or described herein incorporating any embodiment of pocketed spring assembly shown or described herein, a border may be omitted.

Pocketed spring assembly 12 resides upon a base 18 and all components enclosed within an upholstered covering material 20. The base 18 and border 17 are known in the industry as a "bucket" into which a pocketed spring assembly 12 is inserted before the "bucket" is covered with one or more padding or cushioning layers. The base 18 may be foam, a scrim sheet, a piece of plastic, wood or any other known material.

As shown in FIG. 1, fully assembled, the product 10 has a length "L" defined as the linear distance between opposed end surfaces 22 (only one being shown in FIG. 1). Similarly, the assembled product 10 has a width "W" defined as the linear distance between opposed side surfaces 24 (only one being shown in FIG. 1). In the product shown in FIG. 1, the length is illustrated as being greater than the width. However, it is within the scope of the present invention that the length and width may be identical, as in a square product.

As shown in FIGS. 1 and 2, pocketed spring assembly 12 is manufactured from multiple strings 26 of pocketed springs 28 joined together. In pocketed spring assembly 12 shown in FIG. 1, each string 26 of pocketed springs 28 extends longitudinally or from head-to-foot along the full length of the pocketed spring assembly 12. Although the strings 26 of pocketed springs 28 are illustrated as extending longitudinally or from head-to-foot in the pocketed spring assembly 12 of FIG. 1, they may extend transversely or from side-to-side as shown in a pocketed spring assembly 12a shown in the products 10a, 10c shown in FIGS. 1A and 1C, respectively. The pocketed spring assembly 12a comprises multiple strings 26a of pocketed springs 28, identical to the strings of springs 26, but shorter in length. In any of the embodiments shown or described herein, the strings may extend either longitudinally (from end-to-end) or transversely (from side-to-side).

Figure 1B:
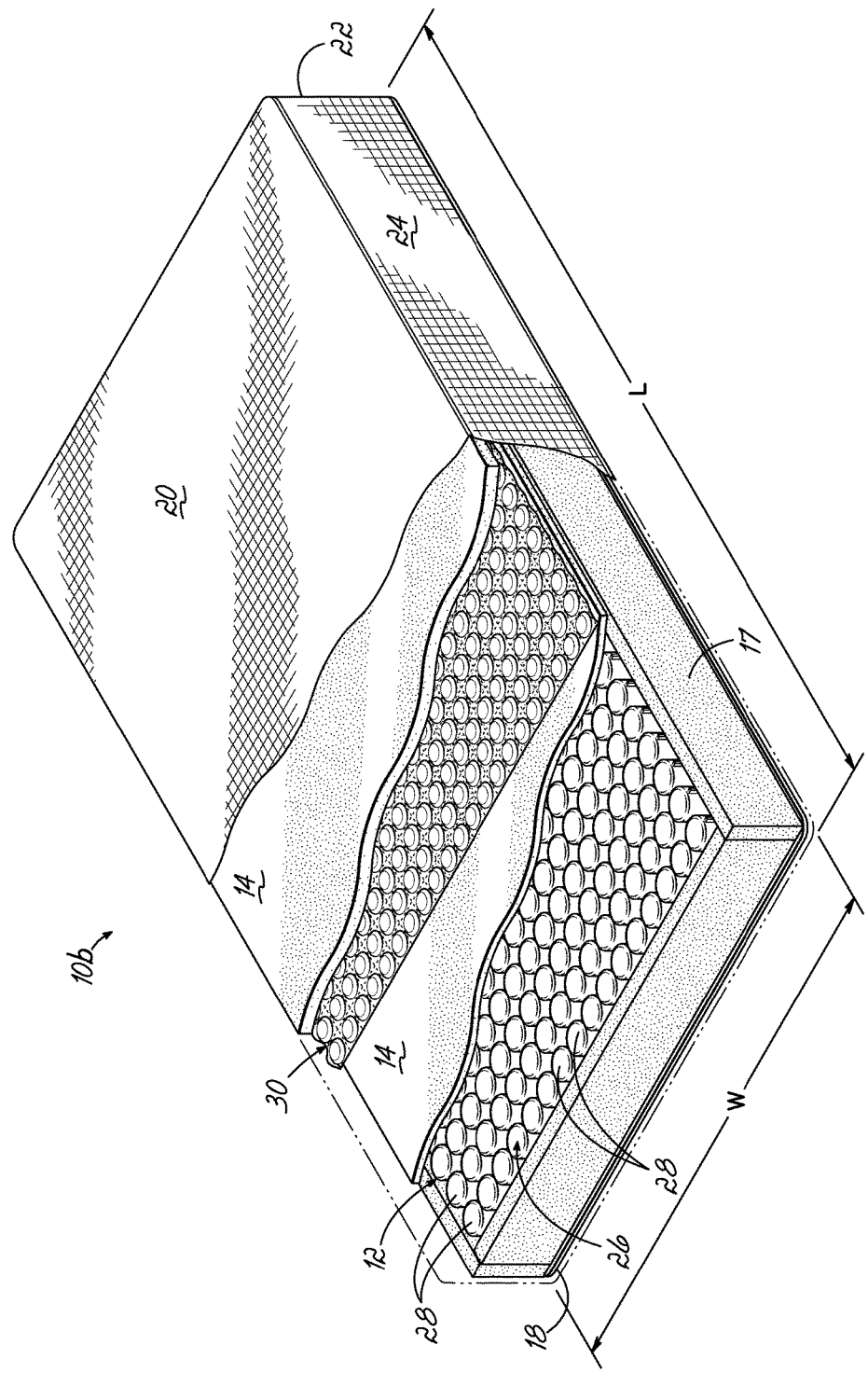
FIG. 1B is a perspective view, partially broken away, of another bedding product incorporating the pocketed spring assembly of FIG. 1A.

FIG. 1B illustrates a single-sided mattress 10b comprising a pocketed spring assembly 12 and border 17 identical to those shown in the mattress 10 of FIG. 1. However, the mattress 10b of FIG. 1B has a pocketed topper 30 employing miniature or small coil springs individually pocketed, in addition to padding layers 14 above and below the pocketed topper 30. Although one configuration of pocketed topper 30 is illustrated, any pocketed topper known in the art may be used, such as the ones disclosed in U.S. Pat. Nos. 9,943,173 and 9,968,202, each of which is fully incorporated by reference herein.

Figure 1C:
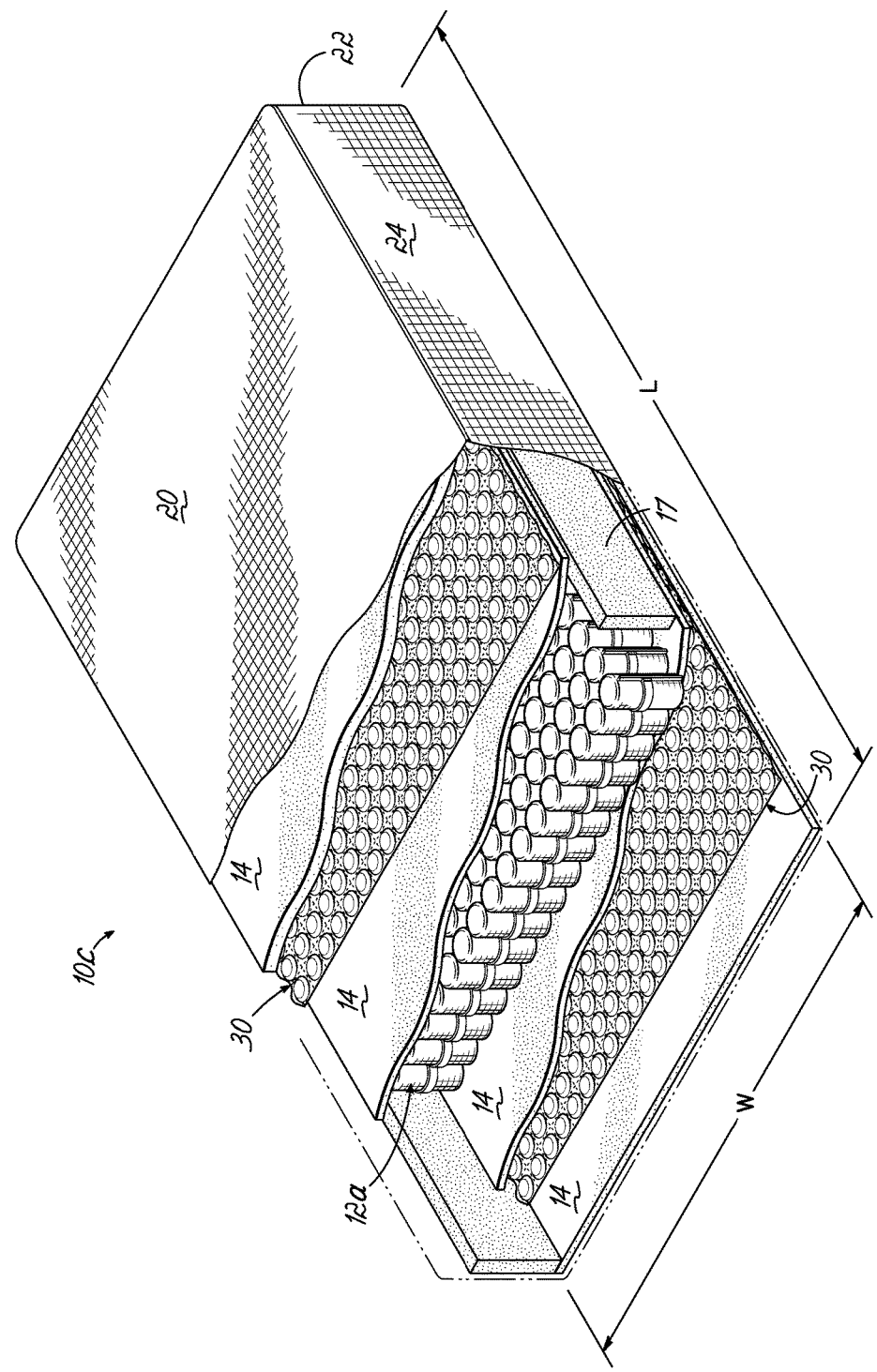
FIG. 1C is a perspective view, partially broken away, of two-sided bedding product incorporating the pocketed spring assembly of FIG. 1A.

FIG. 1C illustrates a double-sided mattress 10c comprising a pocketed spring assembly 12a and border 17. The mattress 10c of FIG. 1B has pocketed toppers 30 above and below the pocketed spring assembly 12a in addition to padding layers 14 above and below each pocketed topper 30. While the mattresses 10, 10a and 10b illustrated in FIGS. 1, 1A and 1B, respectively, are single-sided mattresses, any pocketed spring assembly shown or described herein may be incorporated into any bedding or seating product shown or described herein, including a double-sided mattress or seating cushion, such as the mattress 10c shown in FIG. 1C. If desired, any of the padding or cushioning layers, including one or more pocketed topper 30, may be omitted in any of the embodiments shown or described herein.

Strings of pocketed springs 26, 26a and any other strings of springs described or shown herein, may be connected in side-by-side relationship as, for example, by gluing the sides of the strings together in an assembly machine, to create an assembly or matrix of springs having multiple rows and columns of pocketed springs bound together as by gluing, welding or any other conventional assembly process commonly used to create pocketed spring cores or assemblies.

Figure 4A:
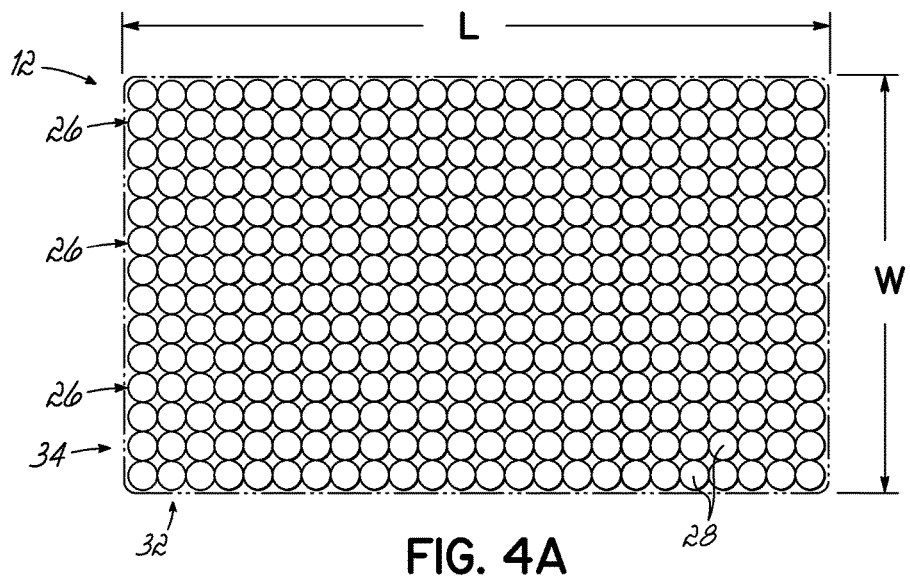
FIG. 4A is a top view of a pocketed spring assembly.

Referring to FIG. 4A, the longitudinally extending strings 26 of pocketed spring assembly 12, along with any other strings described or shown herein, including transversely extending strings 26a of pocketed spring assembly 12a, may be joined so that the individually pocketed springs 28 are aligned in transversely extending rows 32 (extending from side-to-side) and longitudinally extending columns 34 (extending from head-to-foot).

Figure 4B:
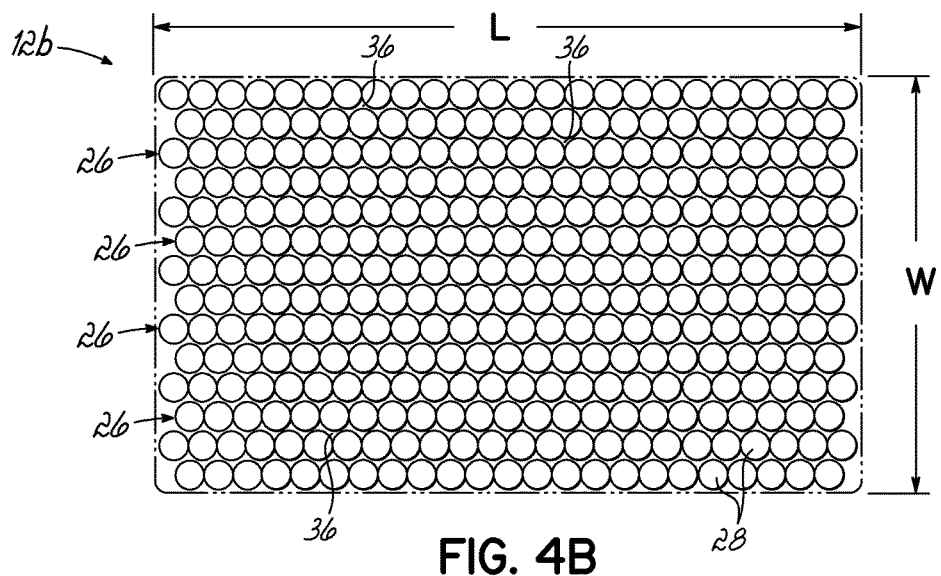
FIG. 4B is a top view of another pocketed spring assembly.

Alternatively, as shown in FIG. 4B, the longitudinally extending strings 26 of pocketed spring assembly 12b, along with any other strings described or shown herein, including transversely extending strings 26a of pocketed spring assembly 12a, may be offset from one another. In such an arrangement, shown in FIG. 4B, the individually pocketed springs 28 are not aligned in rows and columns; instead the individually pocketed springs 28 fill voids 36 of the adjacent strings. Either alignment of strings may be incorporated into any of the pocketed spring assemblies or cores illustrated or described herein.

Figure 2A:
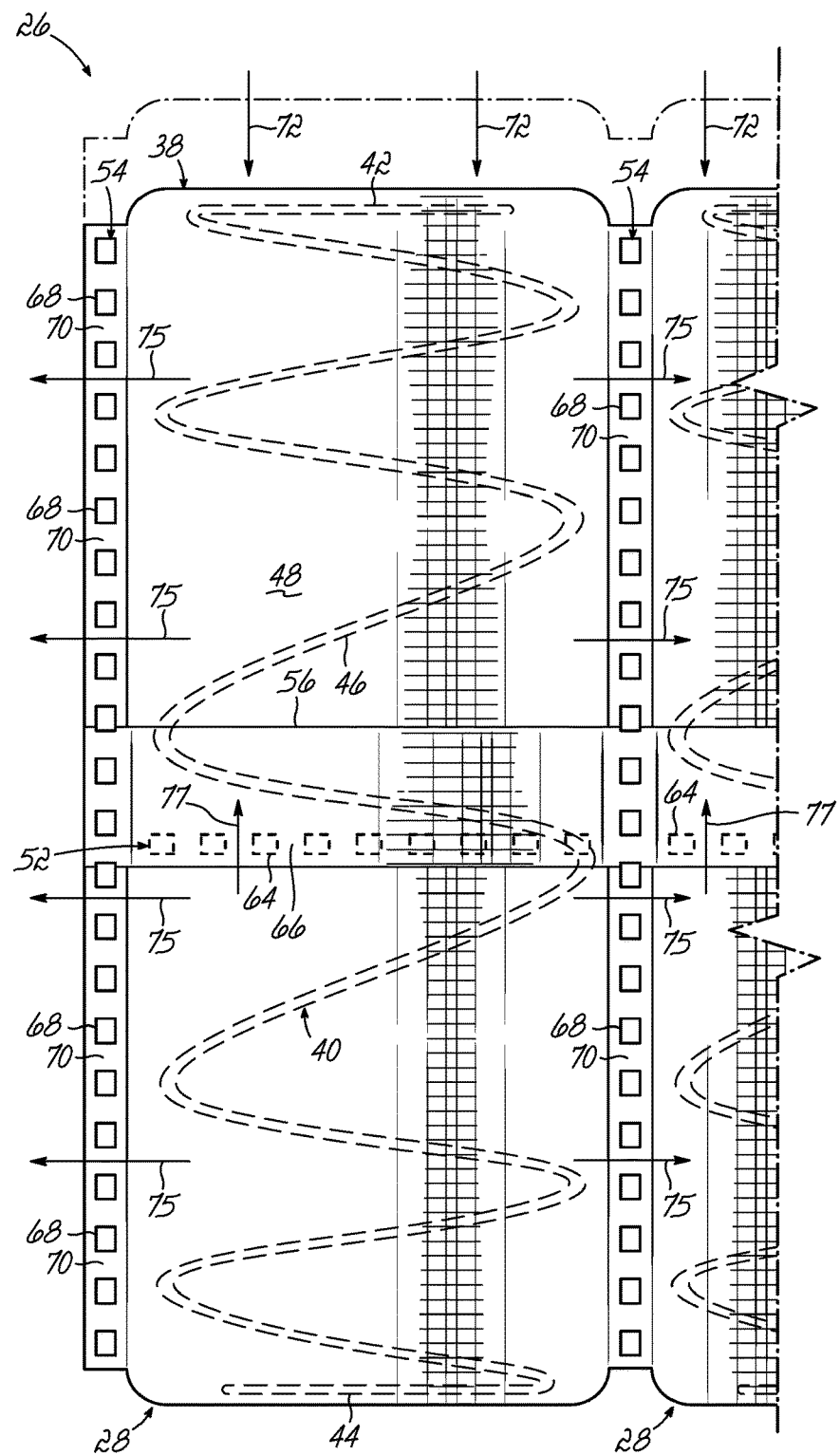
FIG. 2A is a partial side view of one of the strings of springs of the pocketed spring assembly of FIG. 1 being compressed.
Figure 2B:
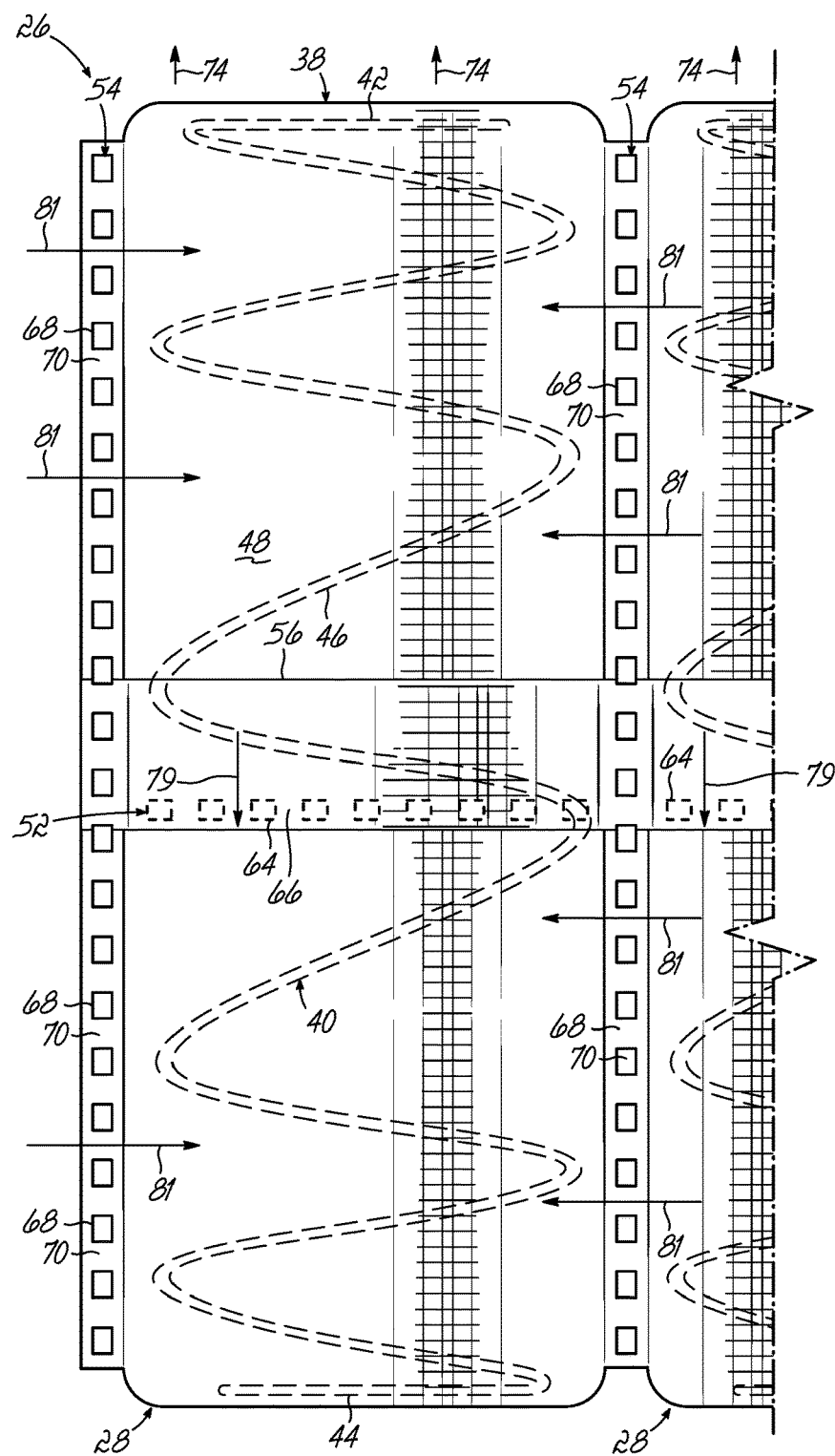
FIG. 2B is a partial side view of the strings of springs of FIG. 2A expanding.
Figure 3:
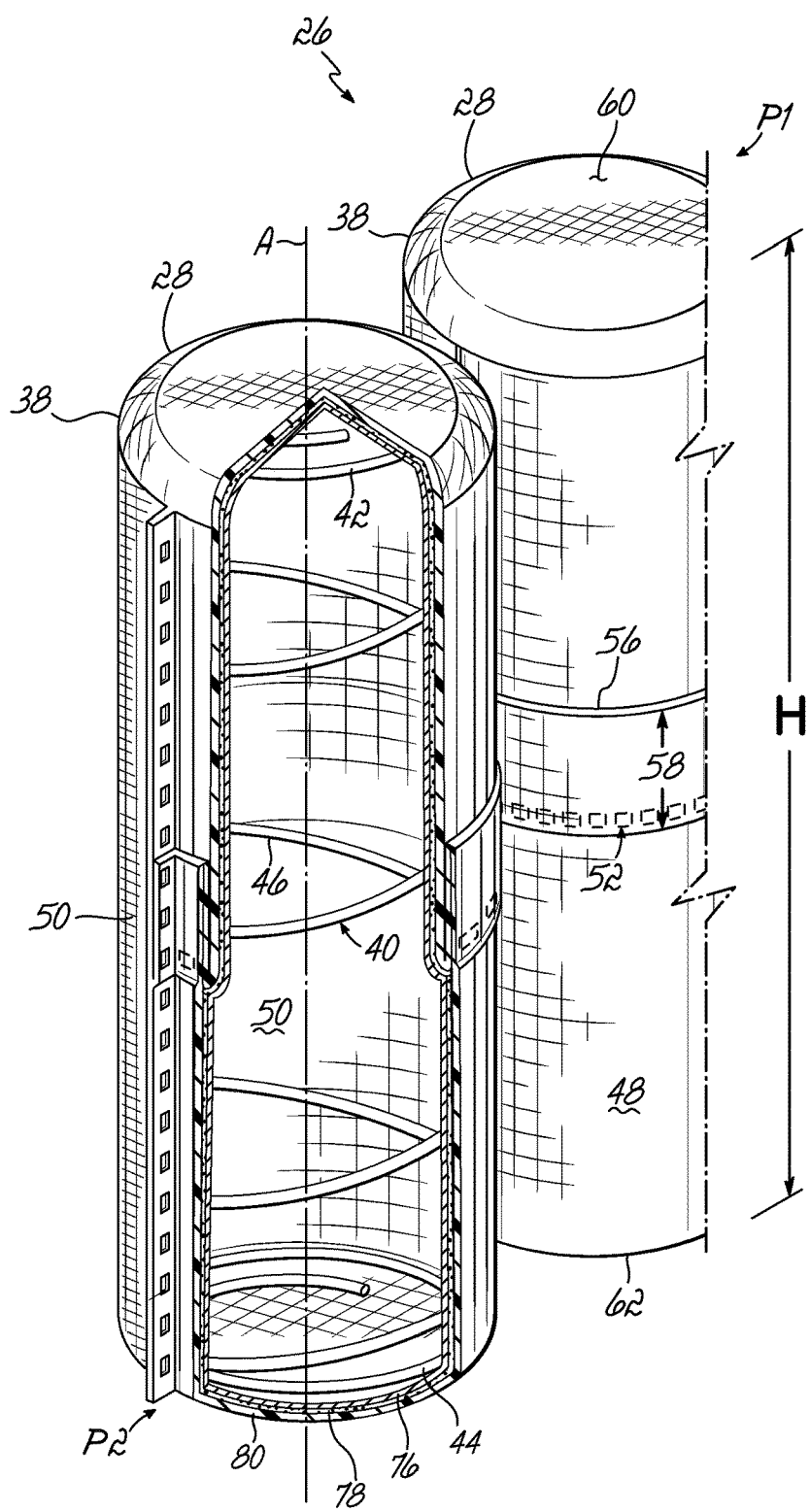
FIG. 3 is a perspective view, partially broken away, of a portion of one of the strings of springs of FIG. 1, in an unloaded condition.

FIG. 2A illustrates a partial side view of an end portion of one of the strings 26 of pocketed springs 28 of pocketed spring assembly 12 being compressed or under an external load. FIG. 2B illustrates a partial side view of the portion of string 26 of pocketed springs 28 of FIG. 2A being uncompressed or after removal of the external load moving towards a relaxed condition. FIG. 3 is a perspective view of the portion of the string 26 of pocketed springs 28 of FIG. 2A in a relaxed condition under no external load.

As best illustrated in FIGS. 2A, 2B and 3, each string 26 of pocketed springs 28 comprises a row of interconnected fabric pockets 38. Each of the fabric pockets 38 contains at least one resilient member, such as a coil spring 40. The resilient member need not be a coil spring; it may be made of foam or other resilient material. The coil spring 40 is preferably made of one piece of wire of a uniform diameter, but may be made of other materials, multiple strands of twisted wire and/or may be a non-uniform diameter, such as a barrel-shaped spring.

As best shown in FIG. 3, each coil spring 40 has a central or longitudinal axis A, an upper end turn 42, a lower end turn 44 and a plurality of central convolutions 46 between the end turns. FIGS. 2A, 2B and 3 illustrate a coil spring 40 in which the diameter of the end turns 42, 44 is generally identical to the diameter of the central convolutions 46. However, any known coil spring may be used inside any the fabric pockets 38. Not all coil springs within a pocketed spring assembly need be identical, although they are most of the time. The pocketed spring assembly of the present invention may use pieces of foam or other resilient members, rather than coil springs. One or more pockets may have more than one spring, such as a coil spring with at least cushion such as a foam insert inside, above or below the coil spring or any combination thereof.

Preferably, one piece of fabric is used to create the string of pocketed springs 26. The piece of fabric is impermeable to airflow through the fabric itself due to at least one of several layers of the fabric being impermeable to airflow through the fabric, as described herein. Air moves between adjacent fabric pockets 38 and into and out of the string 26 only through gaps or valves along the seams or portions of the seams.

The piece of fabric is folded over onto itself around multiple coil springs 40. As best shown in FIG. 3, opposite sides or plies 48, 50 of the fabric are welded or otherwise secured together in segments to create a longitudinal segmented seam 52 and a plurality of separating or transverse segmented seams 54. FIG. 3 illustrates ply 48 being closest to the reader and ply 50 being behind the coil springs 40.

As best shown in FIG. 3, opposed edges 56 of the piece of fabric used to create the string of pocketed springs 26 are aligned and spaced from the longitudinal side seam 52 a distance indicated by numeral 58. Although the drawings indicated the longitudinal seam 52 being below the free edges 56 of the piece of fabric, the longitudinal seam 52 may be above the free edges 56 of the piece of fabric. This is known in the industry as a side seam of a string of springs.

As shown in FIG. 3, in the absence of being subjected to a load, the string of pocketed springs 26 has a generally planar top surface 60 in a top plane P1 and a parallel generally planar bottom surface 62 in a bottom plane P2. The linear distance between the top and bottom surfaces of the string of pocketed springs 26 defines a height H of the string of pocketed springs 26. This linear distance further defines the height H of the pocketed spring assembly 12 because each of the strings of springs 26 has the same height. However, it is within the contemplation of the present invention that the strings of springs be different heights.

As best shown in FIGS. 2A, 2B and 3, the longitudinal seam 52 comprises multiple spaced linear weld segments 64 formed using an ultrasonic welding horn and anvil (not shown) as disclosed in U.S. patent application Ser. No. 15/062,318. Gaps or valves 66 are located between adjacent linear weld segments 64 to allow air to flow between the weld segments 64, as shown by the arrows 77, 79 of FIGS. 2A and 2B, respectively.

Depending upon the airflow desired into and out of the fabric pockets 38 of a string 26 or 26a, at least some of the longitudinal seams 52 of a string may not be segmented or be only partially segmented. For example, the longitudinal seam 52 of a string of springs may not be segmented at all, provided the transverse or separating seams 54 are at least partially segmented to allow airflow into and out of the fabric pockets.

As best shown in FIGS. 2A, 2B and 3, each transverse or separating seam 54 comprises multiple spaced linear weld segments 68 formed using an ultrasonic welding horn and anvil (not shown) to join the opposed plies 48, 50 of fabric as disclosed in U.S. patent application Ser. No. 15/062,318.

Gaps or valves 70 are located between adjacent linear weld segments 68 to allow air to flow between the weld segments 68.

Depending upon the airflow desired into and out of the fabric pockets 38 of a string 26, 26a, at least some of the transverse or separating seams 54 of a string may not be segmented or may be only partially segmented. For example, one or more transverse seams 54 of a string may be partially segmented or not be segmented at all, provided the longitudinal seam 52 is at least partially segmented to allow airflow into and out of the fabric pockets.

As shown in FIG. 2A, when a load is exerted on a pocketed spring 28 of a string 26, as shown by arrows 72, air exits the pocket 38 through gaps 70 between adjacent weld segments 68 of the transverse or separating seams 54 because the multi-layered fabric is impermeable to airflow. See airflow shown by arrows 75. Air passes through gaps 70 between adjacent fabric pockets 38 and out of the string 26 through gaps 70 of the outermost or end transverse or separating seams 54 of the strings of springs 26.

Additionally, air may exit the fabric pocket 38 through gaps 66 between the weld segments 64 of the longitudinal seam 52. See airflow shown by arrows 77. As shown in FIG. 2A, the size of the gaps 70 between the weld segments 68 of transverse or separating seams 54, along with the size of the gaps 66 between the weld segments 64 of the longitudinal seam 52 of the pockets 38, define how quickly air may exit the pocket 38. Air does not exit the pockets 38 other than through the gaps since the fabric is impermeable to airflow. Different strings of springs may have different performance characteristics based on the size of the gaps 70 in the transverse or separating seams 54 and/or the gaps 66 in the longitudinal seam 52 or any combination thereof. Depending upon this airflow, the strings of springs made with such fabric impermeable to airflow may impart different firmness characteristics upon the user or person imparting a load on the string of springs.

As shown in FIG. 2B, when a load is removed from the fabric pocket 38, the coil spring 40 raises the fabric pocket 38 upwardly in the direction of arrows 74. Air re-enters the pocket 38 through the gaps 70 between the weld segments 68 of the transverse or separating seams 54 because the fabric is impermeable to airflow. See airflow shown by arrows 81. Air passes between fabric pockets 38 through these gaps 70 and into the string 26 through the gaps 70 of the outermost or end transverse or separating seams 54.

Additionally, air may enter the fabric pocket 38 through gaps 66 between the weld segments 64 of the longitudinal seam 52. See airflow shown by arrows 79. As shown in FIG. 2B, the size of the gaps 70 between the weld segments 68 of transverse or separating seams 54 along with the size of the gaps 66 between the weld segments 64 of the longitudinal seam 52 of the pockets 38 define how quickly air may enter the pockets 38. Air does not enter the pockets 38 other than through the gaps since the fabric is impermeable to airflow.

Although the weld segments in the embodiments shown are illustrated as being heat-welded spaced rectangular-shaped segments, any of the seam segments may be other shapes, such as spaced dots, ovals or triangles of any desired sizes.

As shown in FIG. 3, the fabric material of each of the strings 26 is impermeable to airflow through the fabric. The fabric comprises three layers, including from the inside of the fabric pocket 38 outwardly as shown in FIG. 3: 1) a protective layer of fabric 76; 2) an airtight layer 78 and 3) a sound attenuating or quieting layer 80. More specifically, the protective layer of fabric 76 may be a polypropylene non-woven fabric layer having a density of approximately one ounce per square yard commercially available from Atex, Incorporated of Gainesville, Ga. The airtight layer 78 may be a polyether thermoplastic polyurethane film layer having a thickness of approximately 1.0 mil (0.001 inches) commercially available from American Polyfilm, Incorporated of Branford, Conn. The sound attenuating layer may be a lofted needle punch polyester fiber batting layer having a density of 0.5 ounces per square foot commercially available from Milliken & Company of Spartanburg, S.C.

These materials and material specifications, such as the densities provided for the outer layers, have proven to be effective, but are not intended to be limiting. For example, the thickness of the impermeable middle layer of thermoplastic polyurethane film may vary depending upon the desired characteristics of the multi-layered fabric. The cited thickness of 1.0 mil is not intended to be limiting. The sound attenuating layer need not be made of polyester; it may be made of other materials. Similarly, the fiber batting need not be lofted.

The middle thermoplastic polyurethane film layer 78 is impermeable to airflow. The lofted needle punch polyester fiber batting layer 80 acts as a sound dampening layer which quiets and muffles the film layer 78 as the springs are released from a load (pressure in the pocket goes from positive to negative) or loaded (pressure in the pocket goes from neutral to positive). The polypropylene non-woven fabric layer 76 keeps the segmented air passages open, such that the pocket 38 may "breathe". Without the polypropylene non-woven fabric layer 76 closest to the springs 40, the middle thermoplastic polyurethane film 78 would cling to itself and not allow enough air to pass through the segmented air passages, valves or gaps in the seams. The polypropylene non-woven fabric protective layer 76 closest to the springs also makes the product more durable by protecting the airtight middle thermoplastic polyurethane film layer 78 from contacting the spring 40 and deteriorating from abrasion against the spring 40.

Although FIG. 3 illustrates a portion of a string of springs 26 used in pocketed spring assembly 12, the three-layered fabric impermeable to airflow may be used in any string of spring shown or described herein, such as strings of springs 26a used in pocketed spring assembly 12a.

Figure 5A:
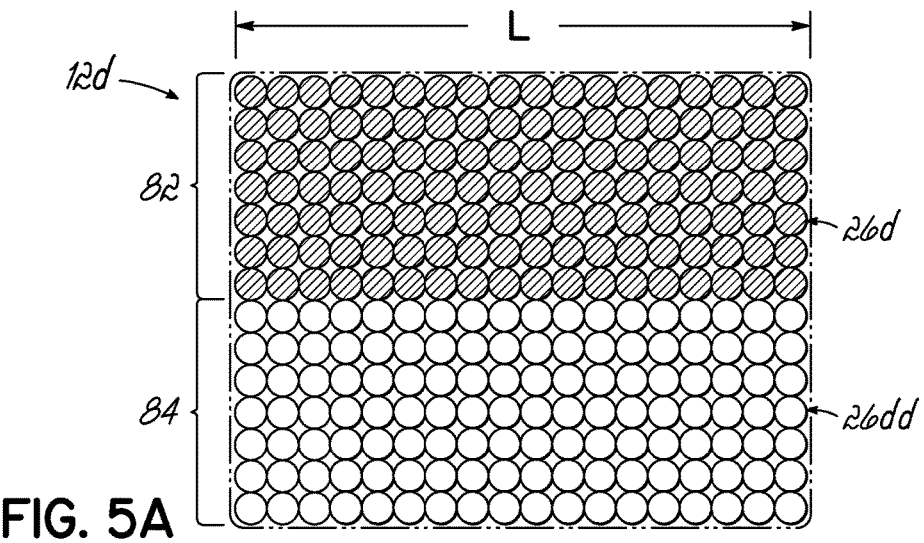
FIG. 5A is a top view of a posturized pocketed spring assembly.

FIG. 5A illustrates a posturized pocketed spring assembly 12d having different zones or regions of different firmness. Pocketed spring assembly 12d comprises multiple longitudinally extending strings of springs 26d, 26dd joined together in one arrangement for a bedding or seating product, such as a mattress. As can be seen, the longitudinally extending strings of springs 26d, 26dd are arranged into two zones or regions in the pocketed spring assembly 12d. By way of example, two zones 82, 84 are illustrated, with the zones corresponding roughly to a "firm" zone or region 82 and a "soft" zone or region 84. The longitudinally extending strings of springs 26d of the "firm" zone 82 are each strings of springs constructed with the multi-layered impermeable fabric shown and described herein. The longitudinally extending strings of springs 26dd of the "soft" zone 84 are each strings of springs constructed with conventional single layer non-woven polypropylene fabric permeable to airflow through the fabric.

Figure 5B:
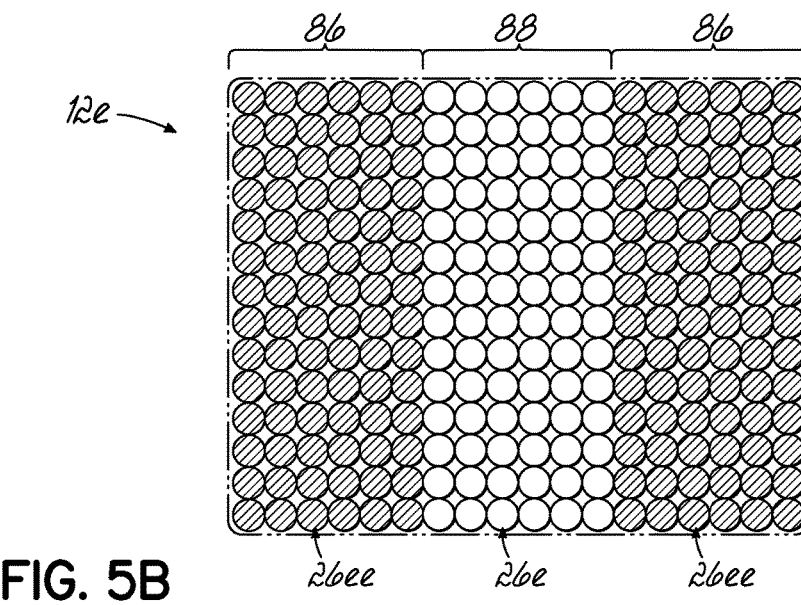
FIG. 5B is a top view of another posturized pocketed spring assembly.

Referring now to FIG. 5B, transversely extending strings of springs 26e, 26ee are shown in one preferable arrangement for a pocketed spring assembly 12e for a bedding or seating product, such as a mattress. As can be seen, the transversely extending strings of springs are arranged in a plurality of zones in the pocketed spring assembly 12e. By way of example, three zones are illustrated, with the zones corresponding roughly to the location of a sleeper's head and shoulders, mid-section, knees and feet. By way of further example, the two end "soft" zones 86 each comprise strings of springs 26ee constructed with conventional single layer non-woven polypropylene fabric permeable to airflow through the fabric. The transversely extending strings of springs 26e of the middle or "firm" zone 88 are each strings of springs constructed with the multi-layered impermeable fabric shown and described herein.

Figure 5C:
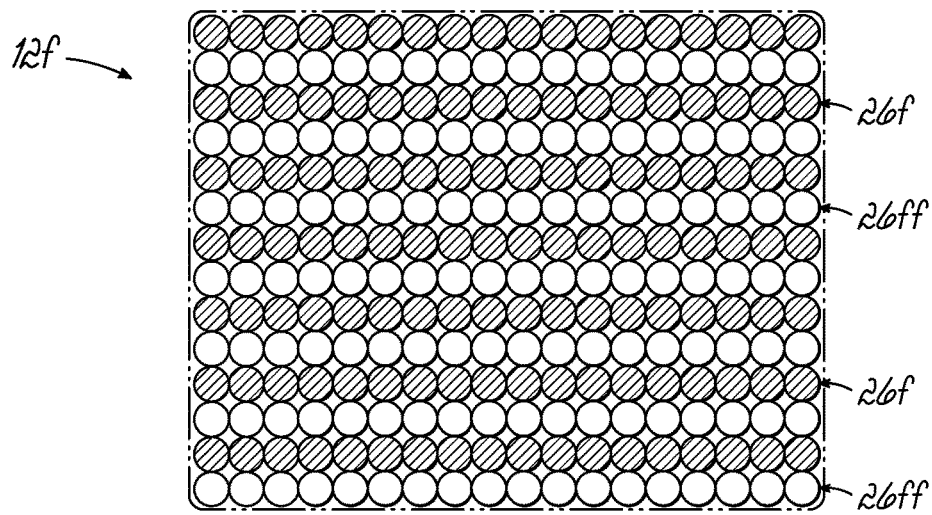
FIG. 5C is a top view of another pocketed spring assembly.

FIG. 5C illustrates another embodiment of pocketed spring assembly incorporating strings of springs made with different fabrics. FIG. 5C illustrates longitudinally extending strings of springs 26f, 26ff arranged in a pocketed spring assembly 12f for a bedding or seating product, such as a mattress. As can be seen, the longitudinally extending strings of springs 26f, 26ff are arranged in an alternating pattern in the pocketed spring assembly 12f. As shown in FIG. 5C, each longitudinally extending string of springs 26f of the pocketed spring assembly 12f is shaded, illustrating the string of springs is constructed with the multi-layered impermeable fabric shown and described herein. Every other longitudinally extending string of springs 26ff of the spring assembly is not shaded, illustrating the string of springs is constructed with conventional single layer non-woven polypropylene fabric permeable to airflow through the fabric.

Figure 5D:
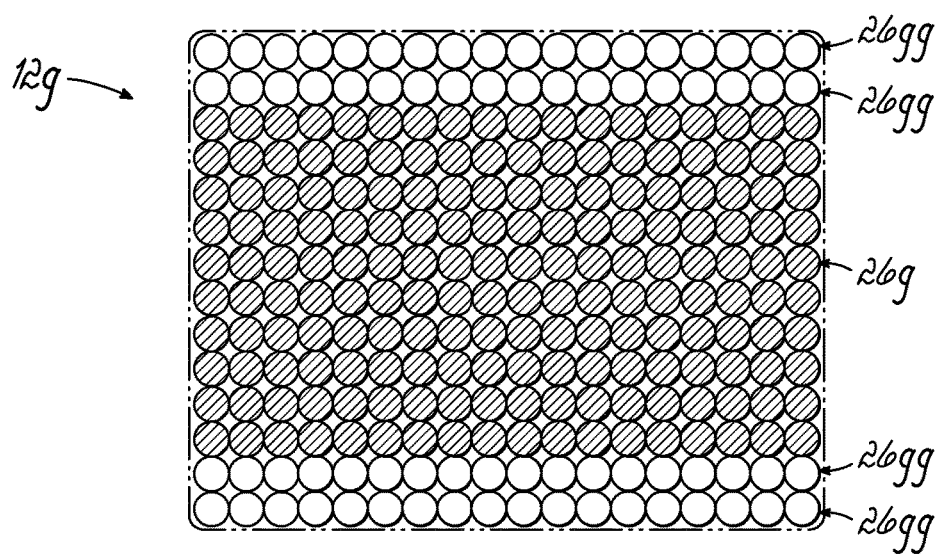
FIG. 5D is a top view of another posturized pocketed spring assembly.

FIG. 5D illustrates another embodiment of pocketed spring assembly 12g incorporating strings of springs made with different fabrics. FIG. 5D illustrates longitudinally extending strings of springs 26g, 26gg arranged in a pocketed spring assembly to provide edge support. As shown in FIG. 5D, the longitudinally extending strings of springs 26g on the interior of the spring assembly is shaded, illustrating the strings of springs is constructed with the multi-layered impermeable fabric shown and described herein. Two outermost longitudinally extending strings of springs 26gg of the pocketed spring assembly along each side of the pocketed spring assembly 12g are not shaded, illustrating each of these strings of springs is constructed with conventional single layer non-woven polypropylene fabric permeable to airflow through the fabric. Of course, the reverse may be true. One or two strings of springs extending along the sides of the pocketed spring assembly may be made using multi-layered impermeable fabric, and the interior strings of springs made using conventional single layer non-woven polypropylene fabric permeable to airflow.

FIG. 6 illustrates an apparatus 90 for conducting a method of making the fabric for use in the strings of springs shown and described herein or for any other bedding or seating product, including the products described in U.S. Pat. No. 9,968,202.

Referring to FIG. 6, the method comprises providing a source 92 of the first protective layer of polypropylene non-woven fabric which may be a roll of polypropylene non-woven fabric or any other source. A web of the protective polypropylene non-woven fabric 76 from the source 92 is passed around a roller 94 and into a laminator 96. The method further comprises providing a source 98 of the middle airtight layer of thermoplastic polyurethane film which may be a roll of the film or any other source. A web of the airtight thermoplastic polyurethane film 78 from the source 98 is passed around a roller 100 and into the laminator 96. The method further comprises providing a source 102 of the third sound attenuating layer of lofted needle punch polyester fiber batting, which may be a roll of the batting or any other source. A web of the sound attenuating material such as lofted needle punch polyester fiber batting 80 from source 102 is passed around a roller 104 and into the laminator 96. The method further comprises providing a source 106 of glue which may be a roll of the glue available from Hanes Industries of Conover, N.C. A web of the glue 108 from source 106 is passed around a roller 110 and into the laminator 96. The web of glue 108 is located between the web of sound attenuating material such as lofted needle punch polyester fiber batting 80 and the web of airtight material such as thermoplastic polyurethane film 78. Once inside the laminator 96, the web of glue 108 is heated so it melts to secure the sound attenuating web of lofted needle punch polyester fiber batting 80 and the airtight web of thermoplastic polyurethane film 78 together. Residual heat from the laminator 96 may temporarily secure the web of the polypropylene non-woven fabric 76 to the middle airtight web of thermoplastic polyurethane film 78 to create a three-layered web 112, which is passed between presser rollers 114 to further secure the three layers together into a finished fabric 116 shown in detail in FIG. 7. As shown in FIG. 6, a cutter 118 may be used to cut the finished fabric 116 to a desired size. Alternatively, the finished fabric 116 may be rolled into a roll 120 after being cut.

Figure 8:
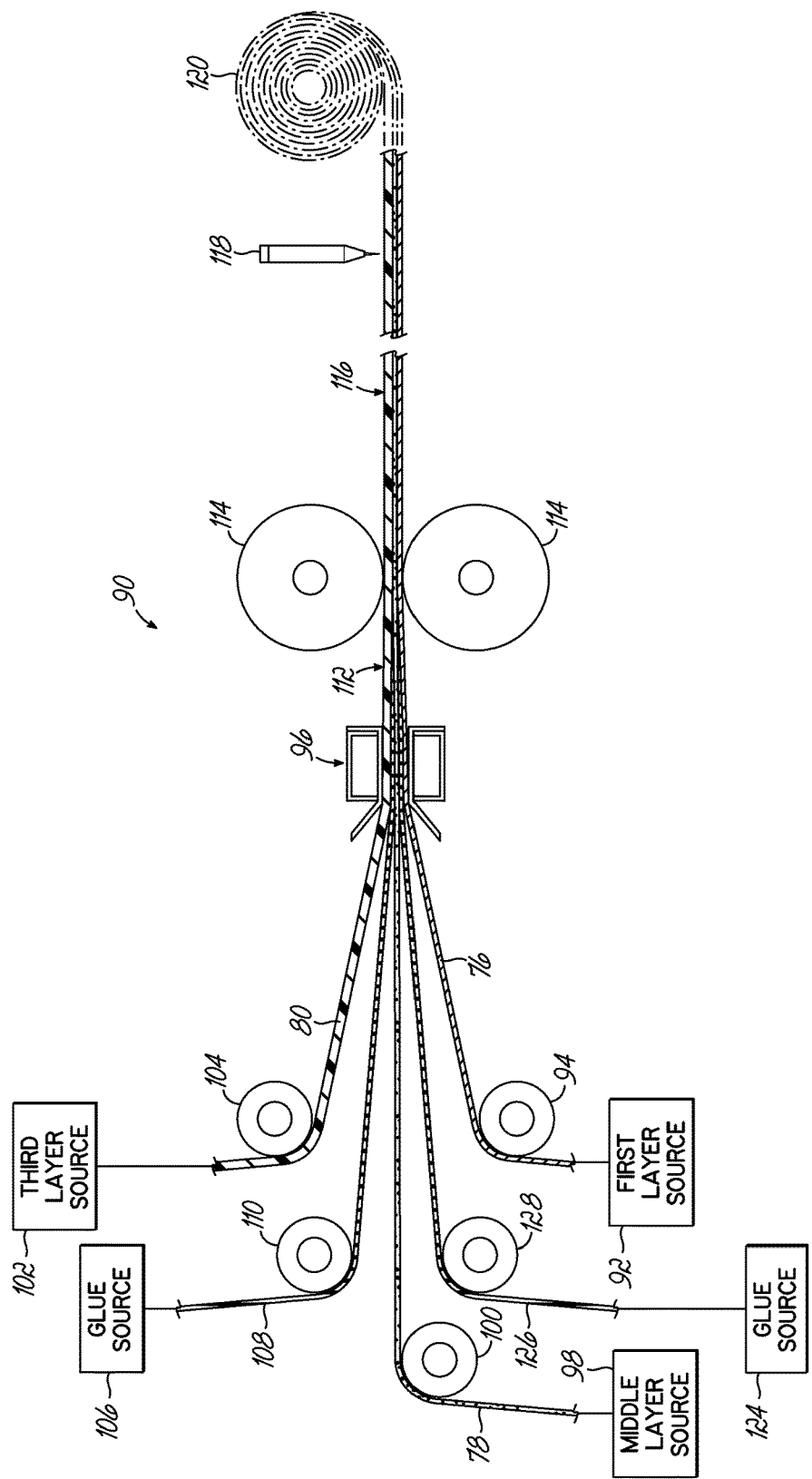
FIG. 8 is a side elevational view of another apparatus for practicing one of the methods of making one of the fabrics of the present invention.

FIG. 8 illustrates the same apparatus for practicing the method shown in FIG. 7, but with the addition of another source of glue and web of glue to further secure the three layers 76, 78 and 80 of the impermeable fabric 116 shown in FIG. 7 together. This method of manufacturing a finished web 116 further comprises providing a second source 124 of glue, which may be a roll of the glue available from Hanes Industries of Conover, N.C. A web of the glue 126 from source 124 is passed around a roller 128 and into the laminator 96. The web of glue 126 is located between the protective web of polypropylene non-woven fabric 76 and the airtight web of thermoplastic polyurethane film 78. Once inside the laminator 96, the web of glue 126 is heated so it melts to secure the web of protective polypropylene non-woven fabric 76 and the airtight web of thermoplastic polyurethane film 78 together. Heat from the laminator 96 melts each web of glue to create a three-layered web 112, which is passed between presser rollers 114 to further secure the three layers together into the finished fabric 116 shown in detail in FIG. 7. As shown in FIG. 6, a cutter 118 may be used to cut the finished fabric 116 to a desired size. Alternatively, the finished fabric 116 may be rolled into a roll 120 after being cut.

Figure 9:
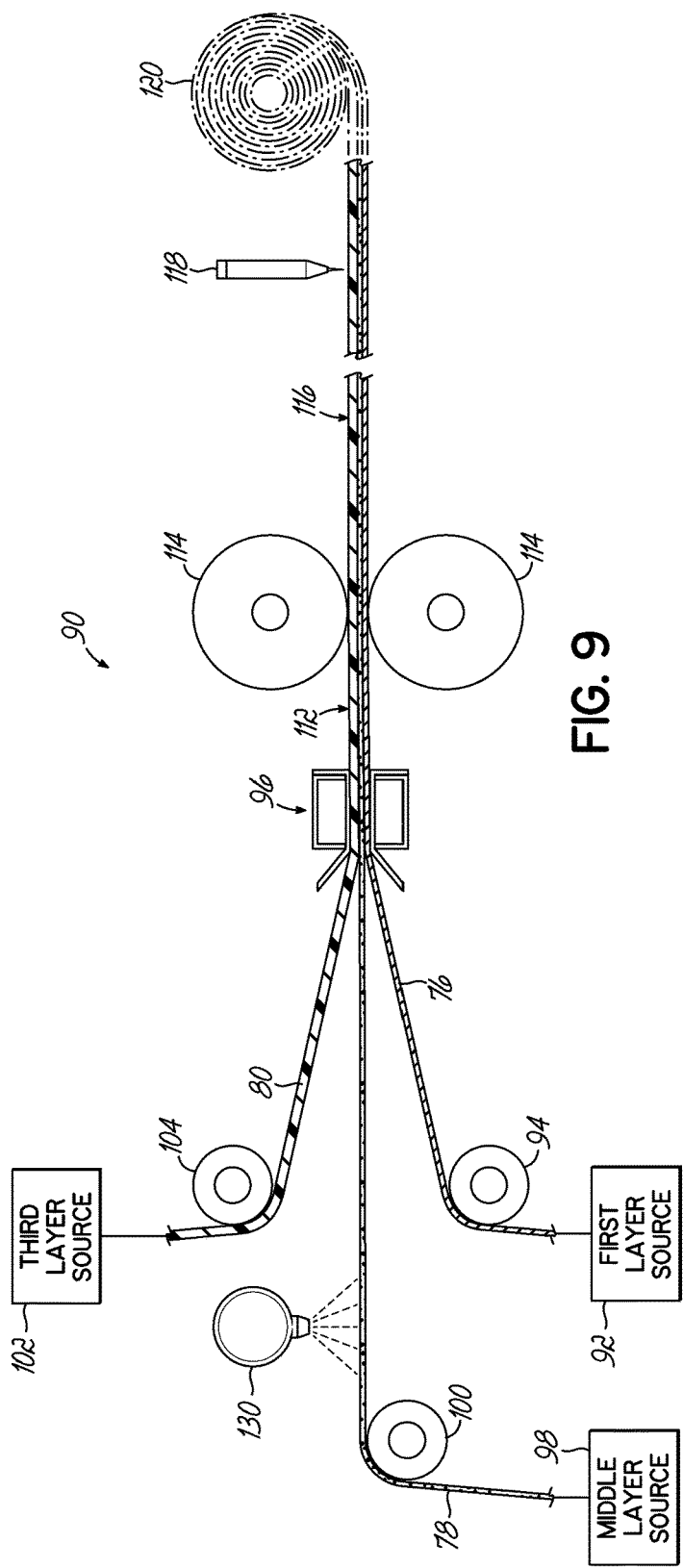
FIG. 9 is a side elevational view of an apparatus for practicing one of the methods of making one of the fabrics of the present invention.

FIG. 9 illustrates a slightly different apparatus for practicing a similar method of manufacturing the three-layered impermeable fabric 116 shown in FIG. 7. This method of manufacturing finished three-layered impermeable fabric web 116 uses a glue sprayer 130, which may apply glue to one surface of the web of thermoplastic polyurethane film 78 between the web of sound attenuating lofted needle punch polyester fiber batting 80 and the airtight web of thermoplastic polyurethane film 78 before entering the laminator 96. Once inside the laminator 96, the glue may be heated so it melts to secure the web of sound attenuating lofted needle punch polyester fiber batting 80 and the airtight web of thermoplastic polyurethane film 78 together. Heat from the laminator 96 melts the glue to create a three-layered web 112, which is passed between presser rollers 114 to further secure the three layers together into the finished fabric 116 shown in detail in FIG. 7. As shown in FIG. 6, a cutter 118 may be used to cut the finished three-layered impermeable fabric 116 to a desired size. Alternatively, the finished three-layered impermeable fabric 116 may be rolled into a roll 120 after being cut.

Although not shown, a second sprayer may be incorporated into the system or apparatus to apply glue to both sides of the airtight web of thermoplastic polyurethane film 78 before the webs pass through the laminator 96.

Figure 10:
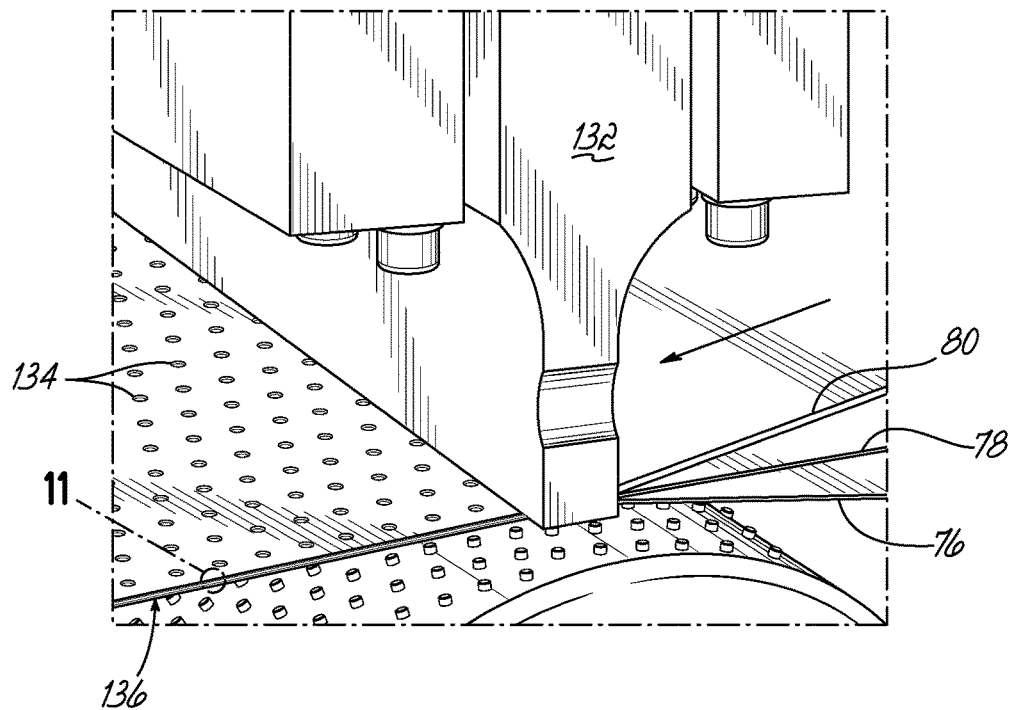
FIG. 10 is a perspective view of a portion of an ultrasonic laminator laminating three webs of material into a unitary three-layered fabric.
Figure 11:
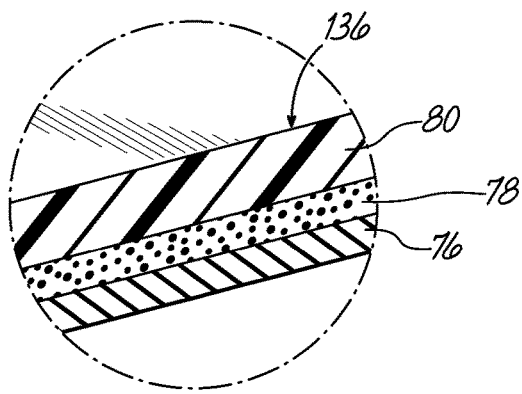
FIG. 11 is an enlarged view of the encircled area 11 of FIG. 10.

FIGS. 10 and 11 illustrate a different apparatus for practicing a different method of manufacturing the three-layered impermeable fabric 136 shown in FIG. 11. This method of manufacturing finished three-layered impermeable fabric web 136 uses an ultrasonic laminator 132, which may weld three incoming webs of material together with ultrasonic welds 134. As shown in FIG. 10, the incoming protective web of polypropylene non-woven fabric 76 is welded to the airtight web of thermoplastic polyurethane film 78 and the sound attenuating web of lofted needle punch polyester fiber batting 80. The ultrasonic laminator 132 joins the three webs at select locations 134 to create a three-layered impermeable fabric web 136 shown in detail in FIG. 11. As shown in FIG. 6, a cutter 118 may be used to cut the finished three-layered impermeable fabric web 136 to a desired size. Alternatively, the finished fabric 136 may be rolled into a roll as shown in FIGS. 6, 8 and 9.

FIGS. 12A, 12B and 12C illustrate another version of string 26' which may be used in any pocketed spring assembly shown or described herein and incorporated into any desired product. The string 26' may be made of any of the fabrics disclosed or shown herein. String 26' functions in the same manner as strings 26, 26a shown and described herein. However, the longitudinal segmented seam 52' and separating or transverse segmented seams 54' are shaped differently. As in fabric pockets 38 of strings 26, 26a described and shown herein, each fabric pocket 38' of string 26' has at least one coil spring 40 inside the fabric pocket 38'.

As shown in FIGS. 12A, 12B and 12C, the longitudinal seam 52' of string 26' comprises multiple spaced linear weld segments 64' formed using an ultrasonic welding horn and anvil (not shown) as disclosed in U.S. Pat. No. 9,968,202. Gaps 66' are located between adjacent linear weld segments 64' to allow air to flow through the gaps 66' between the weld segments 64', as shown by the arrows 77' of FIGS. 12B and 12C. Air may flow out of the string 26' through the gaps 66' located between weld segments 64' of the longitudinal seam 52' at different speeds depending on the load placed upon the string 26'. Similarly, air may flow into the string 26' through the gaps 66' located between weld segments 64' of the longitudinal seam 52' at different speeds depending on the load removed from the string 26'. For purposes of tis document, the gaps 66' between weld segments 64' of the longitudinal seam 52' of string 26' may be considered valves which change in size depending on the load placed upon the string 26' or removed from the string 26' to control air flow as described below.

As shown in FIGS. 12A, 12B and 12C, each transverse seam 54' of string 26' (only one being shown) comprises multiple spaced linear weld segments 68' formed using an ultrasonic welding horn and anvil (not shown) to join the opposed plies 48', 50' of fabric as disclosed in U.S. Pat. No. 9,968,202. Gaps or valves 70' are located between adjacent linear weld segments 68' to allow air to flow between the weld segments 68'. Air may flow through the gaps 70' of the transverse seams 54' of string 26' between weld segments 68' from one pocket 38' to the adjacent pocket 38'. Air may flow into and out of the string 26' through the gaps 70' of the outermost transverse seams 54' at opposite ends of string 26', as shown by arrows 79' in FIG. 12B. For purposes of this document, the gaps 70' of the transverse seams 54' of string 26' may be considered valves which change in size depending on the load placed upon the string 26' or removed from the string 26' to control air flow as described below. Gaps 70' of the transverse seams 54' and gaps 66' of the longitudinal seam 52' of string 26' function as valves in controlling the air flow into and out of the pockets 38' of the string 26' without any material or apparatus other than the multi-layered fabric of the string 26'. The construction of the string 26' has inherent valves therein between seam segments, the valves controlling air flow into and out of the pockets 38' of the string 26' depending upon the size of the seam segments, the load(s) placed on the string 26' and the composition of the fabric material of the string 26', among other factors.

FIG. 12A shows the string 26' without any load placed on the string 26'. The string 26' is in a relaxed condition. Air does not flow through the gaps 70' of the transverse seams 54' of string 26' or through the gaps 66' of the longitudinal seam 52'. The air pressure inside the pockets 38' is at atmospheric pressure at ambient temperature so the valves 66', 70' are in a relatively restrictive state, i.e. relatively flat. The opposed plies 48', 50' of fabric of the transverse seams 54' may be contacting each other or very close to each other. See FIG. 12A.

FIG. 12B shows the string 26' with a light load placed on the string 26', as indicated by arrow 122. Once a light load is placed on the string 26', at least some of the valves or gaps 66' of the longitudinal seam 52' and/or at least some of the valves or gaps 70' of the transverse seams 54' of string 26' or any combination thereof open slightly so that air flows through at least some of the gaps 70' of the transverse seams 54' of string 26' and/or through at least some of the gaps 66' of the longitudinal seam 52' or any combination thereof.

FIG. 12C shows the string 26' with a heavier load placed on the string 26', as indicated by the three arrows 123. Once a large load is placed on the string 26', at least some of the valves or gaps 66' of the longitudinal seam 52' and/or at least some of the valves or gaps 70' of the transverse seams 54' of string 26' or any combination thereof open even more so that more air flows through at least some of the gaps 70' of the transverse seams 54' of string 26' and/or through at least some of the gaps 66' of the longitudinal seam 52' or any combination thereof.

If a load, is applied to the string 26' that is significantly greater than the load need to open the valves 70' transverse seams 54' and valves 66' of the longitudinal seam 52', the fabric material of the string 26' will elastically stretch and open further to allow more air to pass through the valves or gaps in the seams. Thereby, the valves react to the specific load applied. Such reaction contributes to the unique luxurious feel of a pocketed spring assembly made from strings made in accordance with the present invention. The ability of the valves to stretch and react to the air pressure is largely due to the middle thermoplastic polyurethane film layer. The middle thermoplastic polyurethane film layer is a relatively elastic material which returns to its original shape after a load is removed. When the load is released, the valves return to their original condition which is a relatively restrictive state in which the air pressure inside the pockets is at atmospheric pressure at ambient temperature.

It is within the contemplation of the present invention that only some of the strings of a pocketed spring assembly be made in accordance with the present invention. For example, every other string may be made of conventional fabric.

It is further within the scope of the present invention that the different strings shown and described herein may be used together. For example, every other string may have segmented seams as shown in FIGS. 12A, 12B and 12C and the other strings have segmented seams as shown and described elsewhere in this document.

Figure 13:
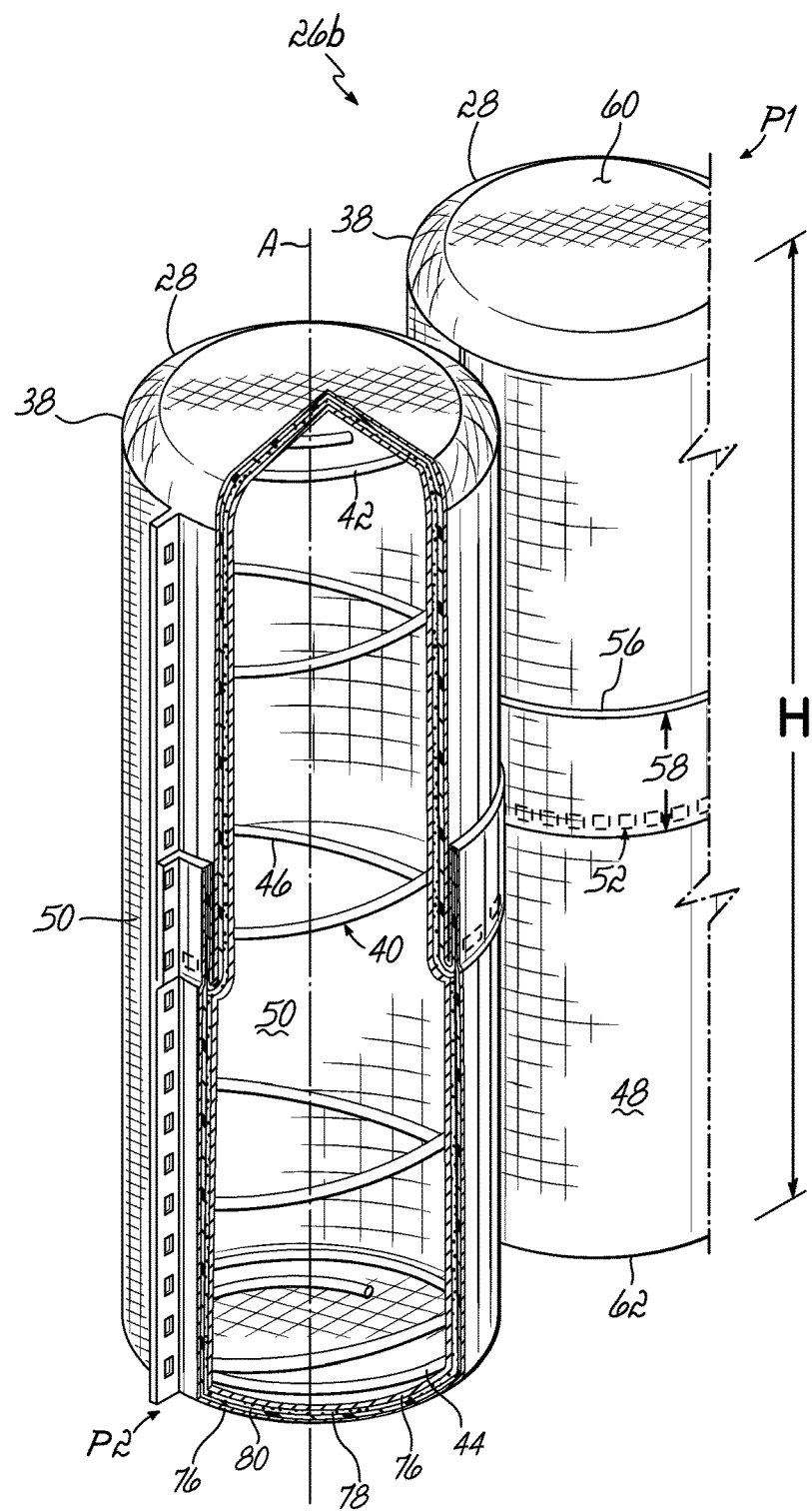
FIG. 13 is a perspective view, partially broken away, of a portion of another embodiment of strings of springs, in an unloaded condition.

FIG. 13 illustrates a view like FIG. 3, but showing a different string 26b having a different fabric material than the strings 26 described herein. For simplicity, like components are numbered the same. Strings 26b may be used in any embodiment shown or described herein. The four-layered fabric material of strings 26b is impermeable to airflow through the fabric, like the three-layered fabric material of strings 26. The fabric comprises four layers, including from the inside of the fabric pocket 38 outwardly as shown in FIG. 13: 1) an inner protective layer of fabric 76; 2) an airtight layer 78; 3) a sound attenuating or quieting layer 80; and 4) an outer protective layer of fabric 76.

The thermoplastic polyurethane film layer 78 is impermeable to airflow. The lofted needle punch polyester fiber batting layer 80 acts as a sound dampening layer which quiets and muffles the film layer 78 as the springs are released from a load (pressure in the pocket goes from positive to negative) or loaded (pressure in the pocket goes from neutral to positive). The polypropylene non-woven fabric layers 76 keep the segmented air passages open, such that the pocket 38 may "breathe". Without the polypropylene non-woven fabric layer 76 closest to the springs 40, the thermoplastic polyurethane film 78 would cling to itself and not allow enough air to pass through the segmented air passages, valves or gaps in the seams. The polypropylene non-woven fabric protective layer 76 closest to the springs also makes the product more durable by protecting the airtight thermoplastic polyurethane film layer 78 from contacting the spring 40 and deteriorating from abrasion against the spring 40. The polypropylene non-woven fabric protective layer 76 furthest from the springs protects the lofted needle punch polyester fiber batting layer 80.

Although FIG. 13 illustrates a portion of a string of springs 26b, the four-layered fabric impermeable to airflow may be used in any string of spring shown or described herein, such as strings 26a used in pocketed spring assembly 12a or strings 26 used in pocketed spring assembly 12.

Figures 14, 15:
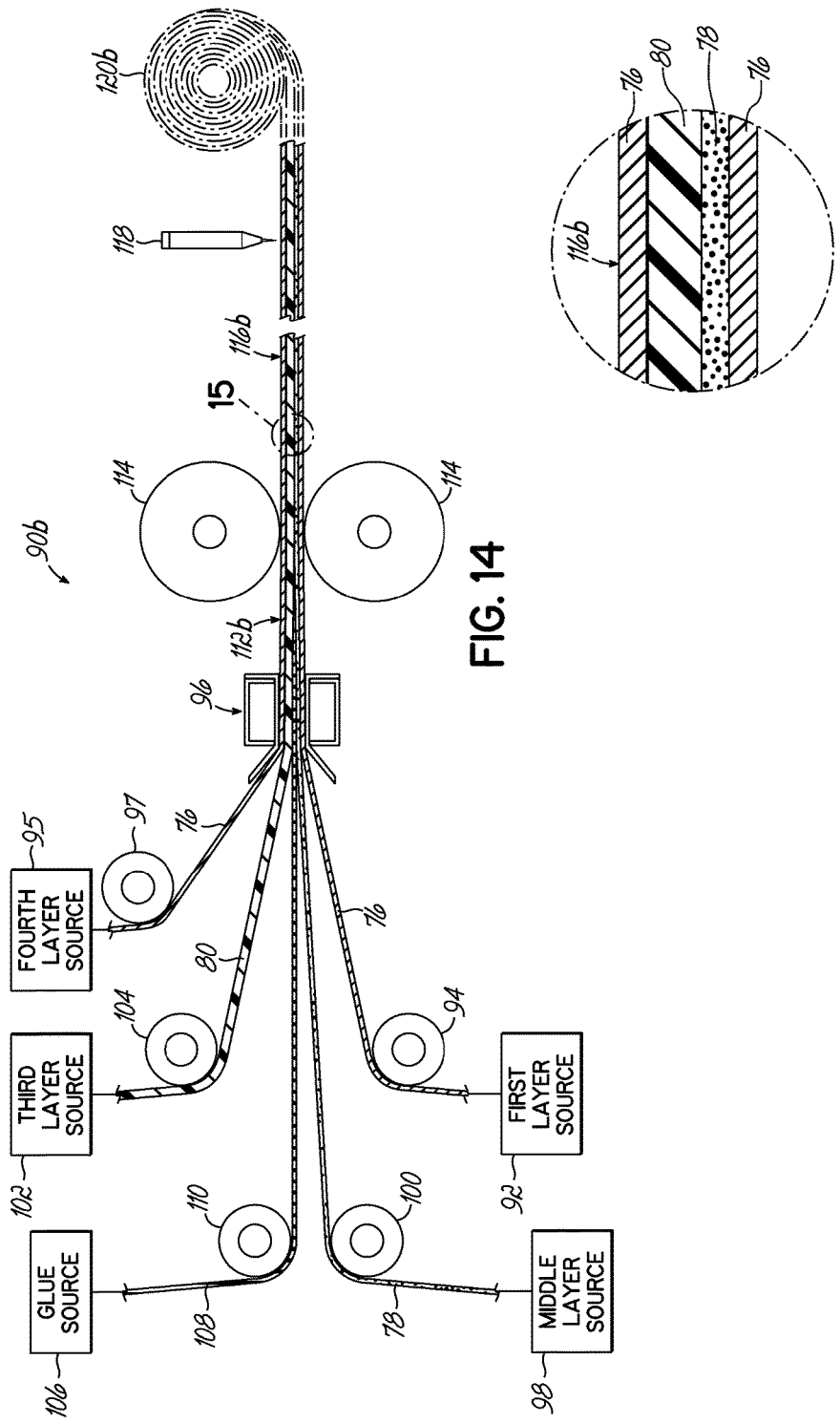
FIG. 14 is a side elevational view of an apparatus for practicing one of the methods of making one of the fabrics of the present invention.
FIG. 15 is an enlarged view of the encircled area 15 of FIG. 14.

FIG. 14 illustrates an apparatus 90b for conducting a method of making the fabric for use in the strings of springs shown and described herein or for any other bedding or seating product, including the products described in U.S. Pat. No. 9,968,202.

Referring to FIG. 14, the method comprises providing a source 92 of the first protective layer of polypropylene non-woven fabric which may be a roll of polypropylene non-woven fabric or any other source. A web of the protective polypropylene non-woven fabric 76 from the source 92 is passed around a roller 94 and into a laminator 96. The method further comprises providing a source 98 of the middle airtight layer of thermoplastic polyurethane film which may be a roll of the film or any other source. A web of the airtight thermoplastic polyurethane film 78 from the source 98 is passed around a roller 100 and into the laminator 96. The method further comprises providing a source 102 of the third sound attenuating layer of lofted needle punch polyester fiber batting, which may be a roll of the batting or any other source. A web of the sound attenuating material such as lofted needle punch polyester fiber batting 80 from source 102 is passed around a roller 104 and into the laminator 96. The method further comprises providing a source 95 of a second protective layer of polypropylene non-woven fabric which may be a roll of polypropylene non-woven fabric or any other source. A web of the protective polypropylene non-woven fabric 76 from source 95 is passed around a roller 97 and into a laminator 96.

The method further comprises providing a source 106 of glue which may be a roll of the glue available from Hanes Industries of Conover, N.C. A web of the glue 108 from source 106 is passed around a roller 110 and into the laminator 96. The web of glue 108 is located between the web of sound attenuating material such as lofted needle punch polyester fiber batting 80 and the web of airtight material such as thermoplastic polyurethane film 78. Once inside the laminator 96, the web of glue 108 is heated so it melts to secure the sound attenuating web of lofted needle punch polyester fiber batting 80 and the airtight web of thermoplastic polyurethane film 78 together. Residual heat from the laminator 96 may temporarily secure the web of the polypropylene non-woven fabric 76 to the middle airtight web of thermoplastic polyurethane film 78 to create a four-layered web 112b, which is passed between presser rollers 114 to further secure the four layers together into a finished fabric 116b shown in detail in FIG. 15. As shown in FIG. 14, a cutter 118 may be used to cut the four-layered finished fabric 116b to a desired size. Alternatively, the four-layered finished fabric 116b may be rolled into a roll 120b after being cut.

Figure 16:
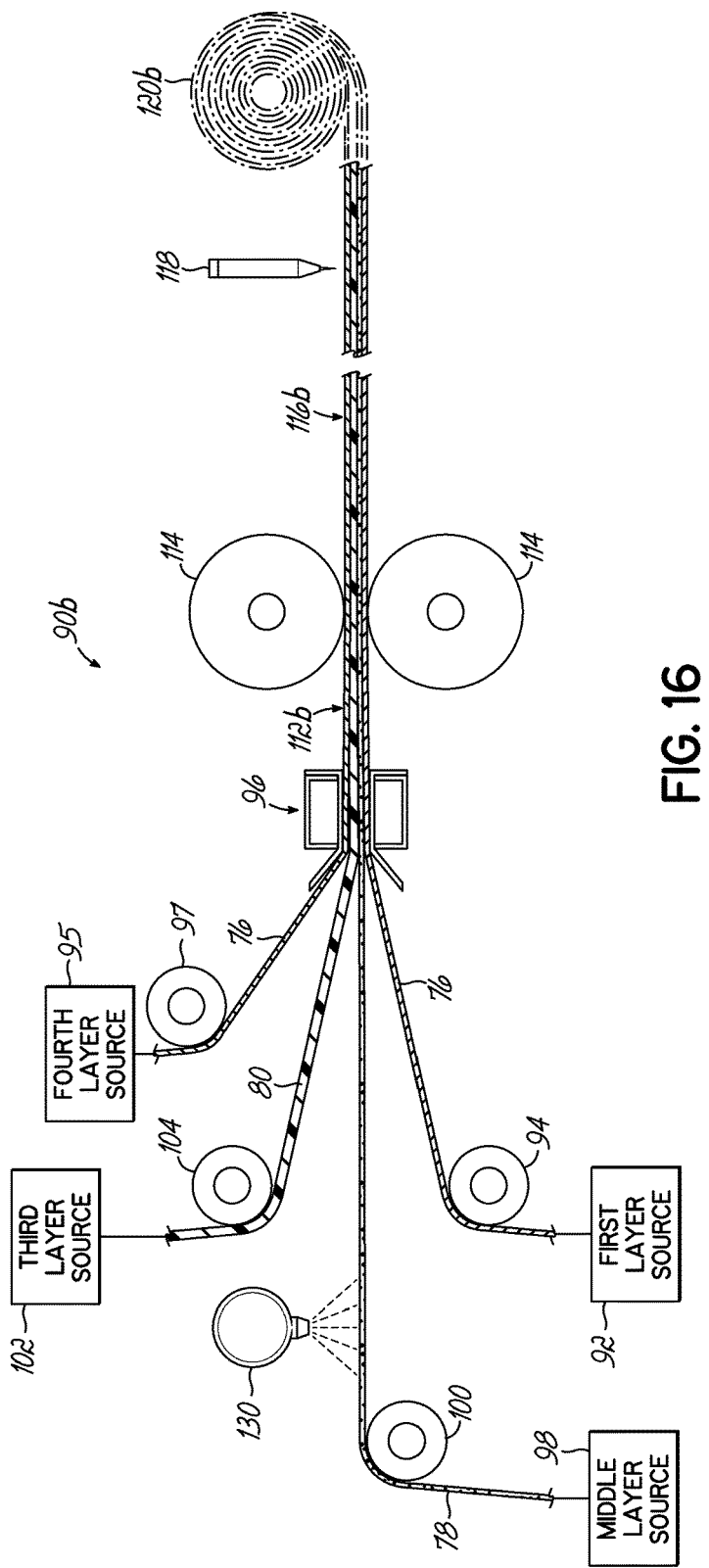
FIG. 16 is a side elevational view of an apparatus for practicing one of the methods of making one of the fabrics of the present invention.

FIG. 16 illustrates a slightly different apparatus for practicing a similar method of manufacturing the four-layered impermeable fabric 116b shown in FIG. 15. This method of manufacturing finished four-layered impermeable fabric web 116b uses a glue sprayer 130, which may apply glue to one surface of the web of thermoplastic polyurethane film 78 between the web of sound attenuating lofted needle punch polyester fiber batting 80 and the airtight web of thermoplastic polyurethane film 78 before entering the laminator 96. Once inside the laminator 96, the glue may be heated so it melts to secure the web of sound attenuating lofted needle punch polyester fiber batting 80 and the airtight web of thermoplastic polyurethane film 78 together. Heat from the laminator 96 melts the glue to create a four-layered web 112b, which is passed between presser rollers 114 to further secure the four layers together into the finished fabric 116b shown in detail in FIG. 15. As shown in FIG. 16, a cutter 118 may be used to cut the finished four-layered impermeable fabric 116b to a desired size. Alternatively, the finished four-layered impermeable fabric 116b may be rolled into a roll 120b after being cut.

Although not shown, a second sprayer may be incorporated into the system or apparatus to apply glue to both sides of the airtight web of thermoplastic polyurethane film 78 before the webs pass through the laminator 96.

Figure 17:
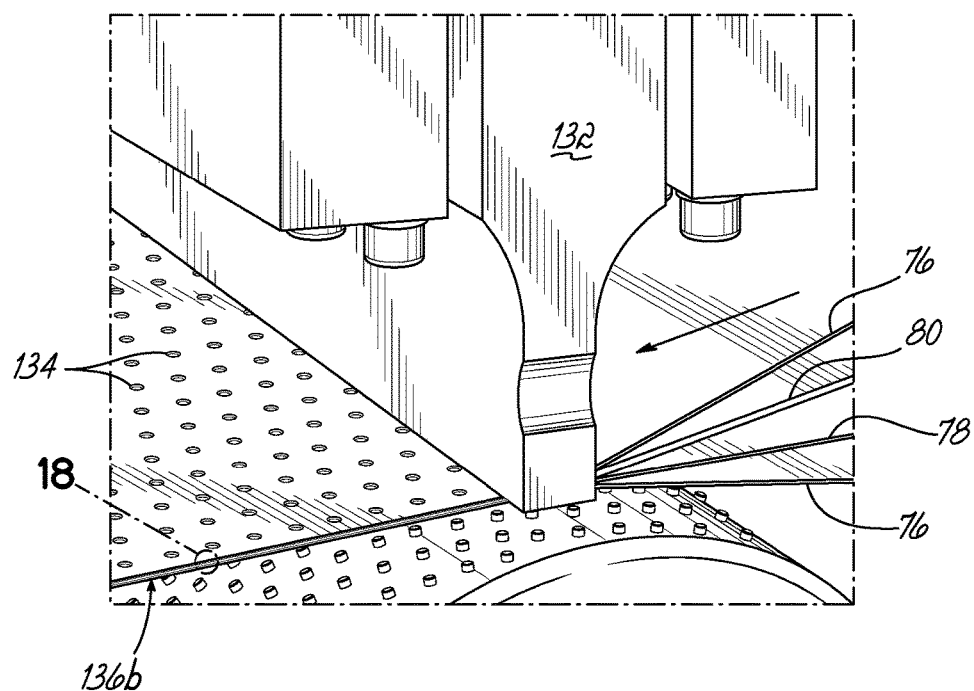
FIG. 17 is a perspective view of a portion of an ultrasonic laminator laminating four webs of material into a unitary four-layered fabric.
Figure 18:
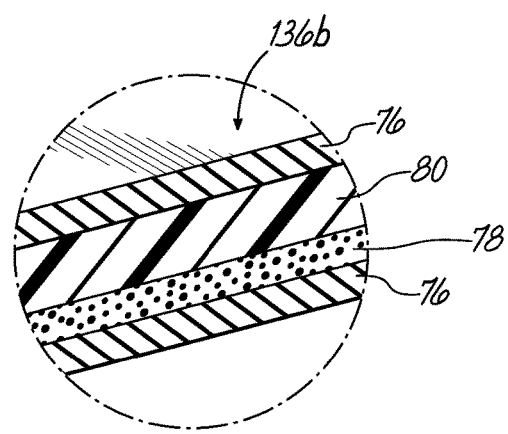
FIG. 18 is an enlarged view of the encircled area 18 of FIG. 17.

FIGS. 17 and 18 illustrate a different apparatus for practicing a different method of manufacturing the four-layered impermeable fabric 136b shown in FIG. 18. This method of manufacturing finished four-layered impermeable fabric web 136b uses an ultrasonic laminator 132, which may weld four incoming webs of material together with ultrasonic welds 134. As shown in FIG. 17, one of the incoming protective webs of polypropylene non-woven fabric 76 is welded to the airtight web of thermoplastic polyurethane film 78 and the other incoming protective web of polypropylene non-woven fabric 76 is welded to the sound attenuating web of lofted needle punch polyester fiber batting 80. The ultrasonic laminator 132 joins the four webs at select locations 134 to create a four-layered impermeable fabric web 136b shown in detail in FIG. 18. As shown in FIGS. 14 and 16, a cutter 118 may be used to cut the finished four-layered impermeable fabric web 136b to a desired size. Alternatively, the finished fabric 136b may be rolled into a roll as shown in FIGS. 14 and 16.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of those features. Accordingly, the scope of the invention shall be limited only by the following claims and their equivalents.

What is claimed is:

1. A bedding or seating product comprising:
    a pocketed spring assembly comprising a plurality of parallel strings of springs joined together, each of said strings of springs comprising a plurality of individually pocketed springs, each of said strings of springs comprising a piece of fabric joined along a longitudinal segmented seam, first and second opposed plies of fabric being on opposite sides of the springs, a plurality of pockets being formed along a length of said string of springs by transverse segmented seams joining said first and second plies, at least one spring being positioned in each said pocket, wherein the piece of fabric comprises multiple layers including a sound attenuation layer between layers of non-woven polypropylene, each of the segmented seams having gaps between segments of the seams such that upon being subjected to a load, the gaps increase in size, allowing more air inside the pocket to exit the pocket;
    cushioning materials; and
    an upholstered covering encasing said pocketed spring assembly and cushioning materials.

2. A pocketed spring assembly for use in a bedding or seating product, the pocketed spring assembly comprising:
    a plurality of parallel strings of springs joined together, each of said strings of springs comprising a plurality of individually pocketed springs, each of said strings of springs comprising a piece of fabric joined along a longitudinal segmented seam, first and second opposed plies of fabric being on opposite sides of the springs, a plurality of pockets being formed along a length of said string of springs by transverse segmented seams joining said first and second plies, at least one spring being positioned in each said pocket, wherein the piece of fabric comprises multiple layers including a sound attenuation layer between layers of non-woven polypropylene, each of the segmented seams having gaps between segments of the seams such that upon being subjected to a load, the gaps increase in size, allowing more air inside the pocket to exit the pocket.

3. The pocketed spring assembly of claim 2 wherein the piece of fabric further comprises a layer impermeable to airflow.

4. The pocketed spring assembly of claim 3 wherein the piece of fabric comprises four layers.

5. The pocketed spring assembly of claim 4 wherein at least one of the layers is impermeable to airflow.

6. The pocketed spring assembly of claim 2 wherein only one of the layers is impermeable to airflow.

7. The pocketed spring assembly of claim 2 wherein the non-woven polypropylene layers are outer protective layers on opposite sides of the piece of fabric.

8. The pocketed spring assembly of claim 2 wherein the sound attenuating layer comprises needle punch polyester fiber batting.

9. A fabric for use in a pocketed spring assembly, said fabric comprising:
 a first layer of protective material;
 a second layer of thermoplastic polyurethane film impermeable to airflow;
 a third layer of sound attenuating material comprising needle punch polyester fiber batting secured to the second layer to prevent noise when the pocketed spring assembly is compressed and expanded, wherein the fabric is oriented such that the first layer of protective material is closest to springs surrounded by the fabric;
 a fourth layer of protective material.

10. The fabric of claim 9 wherein the second and third layers are glued together.

11. The fabric of claim 9 wherein the fabric forms a pocket of the pocketed spring assembly, the pocket surrounding a spring inside the pocket, the first layer being closest to the spring.

12. The fabric of claim 11 wherein the second layer is sandwiched between the first and third layers.

13. The fabric of claim 9 wherein the four layers are laminated together.

14. The fabric of claim 9 wherein the fabric forms multiple pockets of a string of springs for use in the pocketed spring assembly, each pocket surrounding at least one spring inside the pocket.

15. A method of making a fabric for use in a pocketed spring assembly, said method comprising:
 creating a stack comprising opposed layers of protective material, a middle layer impermeable to airflow, a sound attenuating layer and a glue layer between the middle layer impermeable to airflow and the sound attenuating layer;
 passing the stack through a laminator to create a finished fabric; and
 rolling up the finished fabric.

16. The method of claim 15 wherein the glue layer melts in the laminator.

17. The method of claim 15 wherein the sound attenuating layer is secured to the middle layer by the glue to create a sound dampening layer in the finished fabric.

18. A method of making a pocketed spring assembly for use in a bedding or seating product, the method comprising:
 joining a plurality of parallel strings of springs together, each of said strings of springs comprising a plurality of individually pocketed springs, each of said strings of springs comprising a piece of fabric joined along a longitudinal seam, first and second opposed plies of fabric being on opposite sides of the springs, a plurality of pockets being formed along a length of said string of springs by transverse seams joining said first and second plies, at least one spring being positioned in each said pocket, wherein the piece of fabric is impermeable to airflow and comprises outer layers of polypropylene non-woven material and a sound attenuating layer between the outer layers, but air inside the pocket exits and enters the pocket through gaps between segments of the seams.

19. The method of claim 18 wherein the piece of fabric further comprises a layer of thermoplastic polyurethane film impermeable to airflow.

20. A method of making a pocketed spring assembly, the method comprising:
 joining a plurality of parallel strings of springs together, each of said strings of springs comprising a plurality of individually pocketed springs, each of said strings of springs comprising a piece of fabric joined along a longitudinal seam, first and second opposed plies of fabric being on opposite sides of the springs, a plurality of pockets being formed along a length of said string of springs by transverse segmented seams joining said first and second plies, at least one spring being positioned in each pocket, wherein the piece of fabric comprises a layer impermeable to airflow between two protective layers, so the fabric allows air to exit and enter the pocket only through gaps between segments of the seams and the piece of fabric comprises a layer of fiber batting for sound attenuation between two protective layers.

21. The method of claim 20 wherein the protective layers are made of the same material.

\* \* \* \* \*